US012759609B2

(12) United States Patent
Ruggiero et al.

(10) Patent No.: US 12,759,609 B2
(45) Date of Patent: Oct. 13, 2026

(54) CHILD STROLLER APPARATUS AND CHILD SEAT SUITABLE FOR USE ON THE SAME

(71) Applicant: Wonderland Switzerland AG, Steinhausen (CH)

(72) Inventors: Anthony V. Ruggiero, Downingtown, PA (US); Robert E. Haut, Merion Station, PA (US); Andrew J. Taylor, Mohnton, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 249 days.

(21) Appl. No.: 18/772,815

(22) Filed: Jul. 15, 2024

(65) Prior Publication Data

US 2024/0367706 A1 Nov. 7, 2024

Related U.S. Application Data

(63) Continuation of application No. 17/499,260, filed on Oct. 12, 2021, now Pat. No. 12,065,186, which is a continuation of application No. 16/185,690, filed on Nov. 9, 2018, now Pat. No. 11,173,940, which is a continuation of application No. 15/492,091, filed on Apr. 20, 2017, now Pat. No. 10,239,550.

(60) Provisional application No. 62/356,895, filed on Jun. 30, 2016, provisional application No. 62/329,677, filed on Apr. 29, 2016.

(51) Int. Cl.

| | |
|---|---|
| ***B62B 9/24*** | (2006.01) |
| ***B62B 7/10*** | (2006.01) |
| ***B62B 7/14*** | (2006.01) |

(52) U.S. Cl.
CPC .............. *B62B 7/105* (2013.01); *B62B 7/142* (2013.01); *B62B 9/245* (2013.01); *B62B 2205/22* (2013.01)

(58) Field of Classification Search
CPC ........... B62B 7/06; B62B 7/062; B62B 7/064; B62B 7/105; B62B 7/142; B62B 7/145; B62B 9/102; B62B 9/104; B62B 9/245
See application file for complete search history.

(56) References Cited

U.S. PATENT DOCUMENTS 4,412,688 A * 11/1983 Giordani .................. B62B 7/08 280/658
4,762,335 A * 8/1988 Kassai ...................... B62B 7/08 280/649

(Continued)

*Primary Examiner* — Katy M Ebner
(74) *Attorney, Agent, or Firm* — CANTOR COLBURN LLP

(57) ABSTRACT

A child seat includes a seat frame, a tray, a tray latch and a linking member. The seat frame includes a first frame portion having a side coupling part, and a second frame portion pivotally connected with the side coupling part. The tray is pivotally connected with the side coupling part for rotation. The tray latch is pivotally connected with the side coupling part, and can engage with the tray for locking the tray to the side coupling part and disengage from the tray for rotation of the tray. The linking member is operatively connected with the tray latch and the second frame portion, wherein a rotation of the second frame portion for collapsing the child seat causes a movement of the linking member that urges the tray latch to rotate relative to the side coupling part and disengage from the tray.

20 Claims, 17 Drawing Sheets

(56) References Cited

U.S. PATENT DOCUMENTS

| | | | | |
|---|---|---|---|---|
| 7,281,732 | B2 * | 10/2007 | Fox | B62B 7/08 280/650 |
| 7,390,012 | B2 * | 6/2008 | Church | B62B 7/08 280/658 |
| 7,717,456 | B2 * | 5/2010 | Chen | B62B 9/24 280/649 |
| 8,430,456 | B2 * | 4/2013 | Nowak | B62B 9/102 297/423.26 |
| 8,523,218 | B2 * | 9/2013 | Doucette | B62B 9/104 280/47.4 |
| 8,696,016 | B2 * | 4/2014 | Homan | B62B 9/104 280/47.38 |
| 8,714,581 | B2 * | 5/2014 | Fritz | B62B 9/245 280/643 |
| 8,833,794 | B2 * | 9/2014 | Yi | B62B 7/08 280/649 |
| 8,998,241 | B1 * | 4/2015 | Cheng | B62B 7/08 280/47.38 |
| 9,028,006 | B2 * | 5/2015 | Yi | A47D 15/006 297/487 |
| 9,050,993 | B2 * | 6/2015 | Pollack | B62B 7/08 |
| 9,108,659 | B2 * | 8/2015 | Sparling | B62B 7/142 |
| 9,428,208 | B1 * | 8/2016 | Chen | B62B 9/185 |
| 10,137,922 | B2 * | 11/2018 | Yuan | B62B 9/26 |
| 10,239,550 | B2 * | 3/2019 | Ruggiero | B62B 7/142 |
| 10,888,175 | B2 * | 1/2021 | Zhong | A47D 1/10 |
| 11,225,279 | B2 * | 1/2022 | Horst | B62B 7/145 |
| 2006/0125210 | A1 * | 6/2006 | Fox | B62B 7/08 280/642 |
| 2007/0246915 | A1 * | 10/2007 | Madigan | B62B 9/102 280/642 |
| 2008/0079239 | A1 * | 4/2008 | Li | B62B 7/10 280/642 |
| 2009/0033066 | A1 * | 2/2009 | Saville | B62B 9/104 280/650 |
| 2010/0201104 | A1 * | 8/2010 | Jacobs | B62B 9/18 280/650 |
| 2010/0244408 | A1 * | 9/2010 | Dean | B62B 7/142 403/103 |
| 2010/0308552 | A1 * | 12/2010 | Mival | B62B 7/08 280/47.4 |
| 2010/0314855 | A1 * | 12/2010 | Mival | B62B 7/08 280/650 |
| 2011/0012325 | A1 * | 1/2011 | Gower | B62B 7/08 280/648 |
| 2013/0140797 | A1 * | 6/2013 | Fritz | B62B 7/06 280/649 |
| 2013/0168947 | A1 * | 7/2013 | Offord | B62B 7/105 280/658 |
| 2014/0117647 | A1 * | 5/2014 | Wang | B62B 7/068 280/650 |
| 2017/0217471 | A1 * | 8/2017 | Haut | B62B 7/12 |
| 2018/0086359 | A1 * | 3/2018 | Hanson | B62B 9/245 |
| 2020/0172142 | A1 * | 6/2020 | Young | B62B 7/142 |

* cited by examiner

100

CHILD STROLLER APPARATUS AND CHILD SEAT SUITABLE FOR USE ON THE SAME

CROSS-REFERENCE TO RELATED APPLICATION(S)

This application is a continuation application of U.S. patent application Ser. No. 17/499,260 filed on Oct. 12, 2021, which is a continuation application of U.S. patent application Ser. No. 16/185,690 filed on Nov. 9, 2018, now granted as U.S. Pat. No. 11,173,940 B2, which is a continuation application of U.S. patent application Ser. No. 15/492,091 filed on Apr. 20, 2017, now granted as U.S. Pat. No. 10,239,550 B2, which respectively claims priority to U.S. provisional application No. 62/329,677 filed on Apr. 29, 2016, and to U.S. provisional application No. 62/356,895 filed on Jun. 30, 2016, the disclosures of all of which are hereby incorporated by reference as if set forth in their entireties herein.

BACKGROUND

1. Field of the Invention

The present invention relates to child stroller apparatuses.

2. Description of the Related Art

Child strollers can provide a convenient way to transport babies and children. For a more flexible use, some child strollers may accommodate multiple utility features, such as a removable seat and a removable bassinet. The removable seat and bassinet are conventionally provided as separate components that can be individually installed on and removed from the stroller frame through an adapter or seat mount according to the caregiver's needs. Unfortunately, many existing strollers that have a removable seat may not fold as compactly as others due to the presence of the adapter or seat mount.

Therefore, there is a need for a child stroller apparatus that is more flexible in use, easy to operate and address at least the foregoing issues.

SUMMARY

The present application describes a child stroller apparatus and a child seat that can be collapsible to a compact size.

According to an aspect, the child seat includes a seat frame, a tray, a tray latch and a linking member. The seat frame includes a first frame portion having a side coupling part, and a second frame portion pivotally connected with the side coupling part, the first frame portion and the second frame portion being rotatable relative to each other for unfolding and collapsing the child seat. The tray is pivotally connected with the side coupling part, and is rotatable relative to the side coupling part. The tray latch is pivotally connected with the side coupling part, and is operable to engage with the tray for locking the tray to the side coupling part and disengage from the tray for rotation of the tray relative to the side coupling part. The linking member is operatively connected with the tray latch and the second frame portion, wherein a rotation of the second frame portion for collapsing the child seat causes a movement of the linking member that urges the tray latch to rotate relative to the side coupling part and disengage from the tray.

DETAILED DESCRIPTION OF THE EMBODIMENTS

Figure 1:
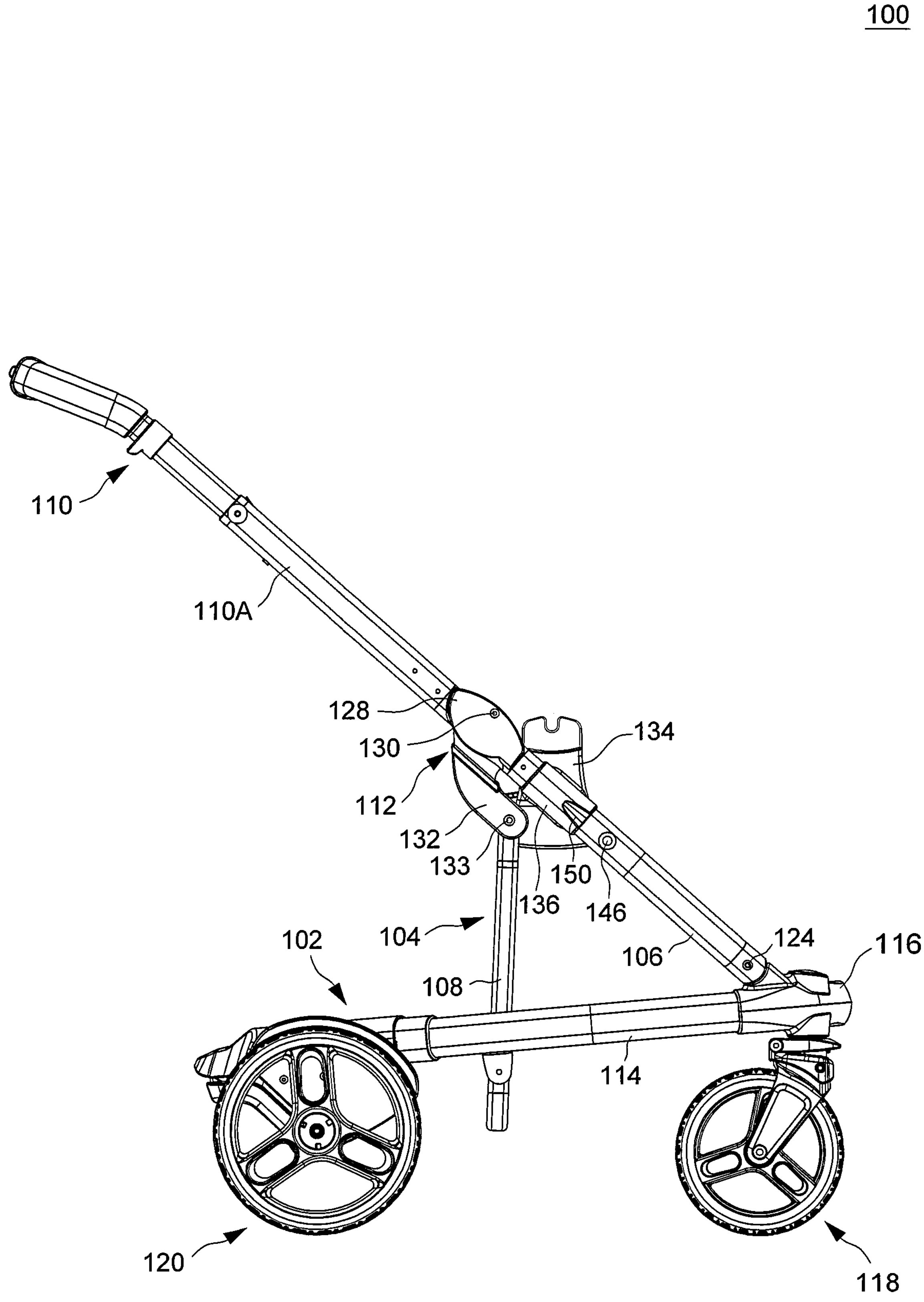
FIG. 1 is a side view illustrating an embodiment of a child stroller apparatus in an unfolded state for use.
Figure 2:
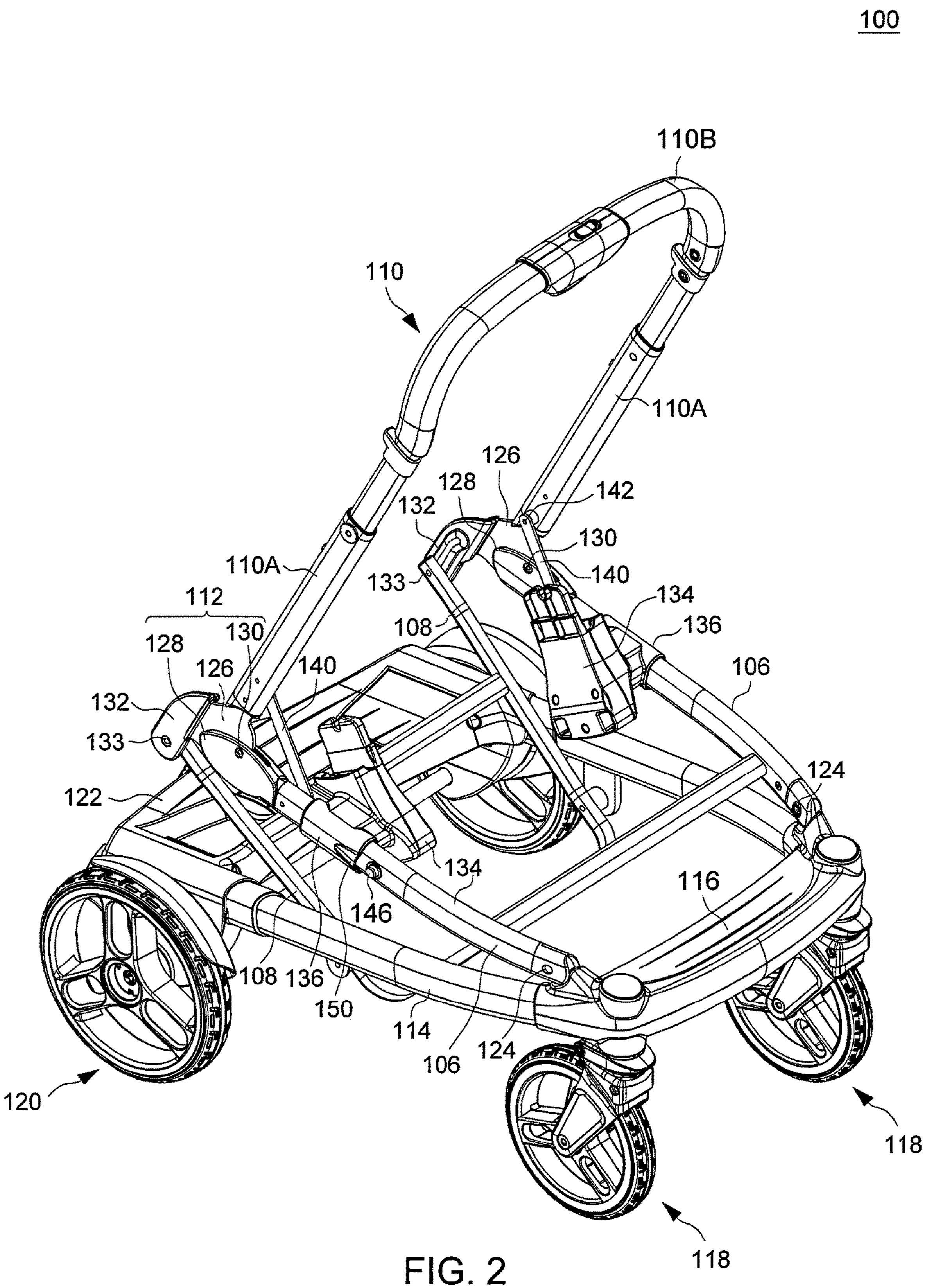
FIG. 2 is a perspective view illustrating the child stroller apparatus in an intermediate state between the unfolded state and a collapsed state.
Figure 3:
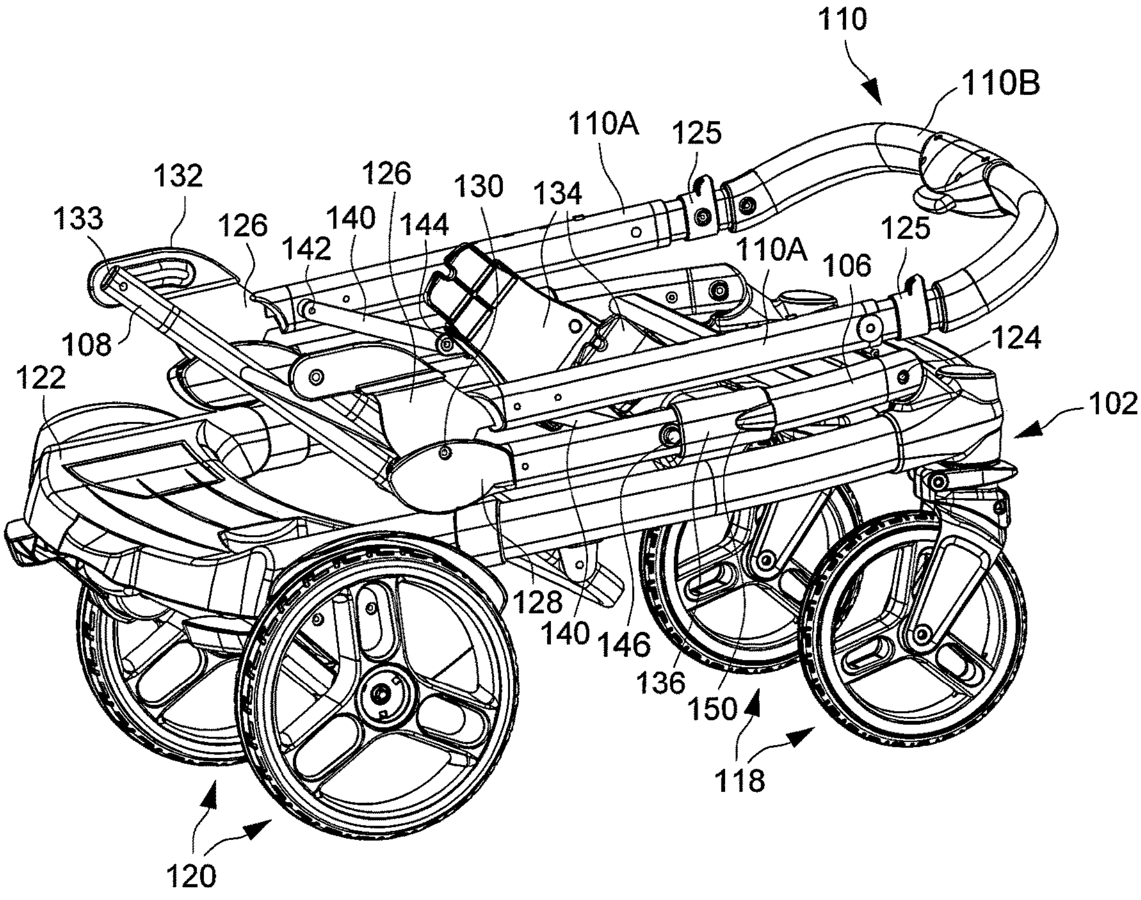
FIG. 3 is a perspective view illustrating the child stroller apparatus in a collapsed state.

FIG. 1 is a side view illustrating an embodiment of a child stroller apparatus 100 in an unfolded state for use, FIG. 2 is a perspective view illustrating the child stroller apparatus 100 in an intermediate state between the unfolded state and a collapsed state, and FIG. 3 is a perspective view illustrating the child stroller apparatus 100 in a collapsed state. Referring to FIGS. 1-3, the child stroller apparatus 100 can include a base frame 102, and an upper frame portion 104 coupled to the base frame 102 with the upper frame portion 104 being comprised of two front or first leg portions 106, two rear or second leg portions 108, a handle frame 110 and two joint structures 112.

The base frame 102 can extend generally horizontally when the child stroller apparatus 100 is in an unfolded state on a floor surface. According to one example of construction, the base frame 102 may include two side tube portions 114, a footrest 116, front wheels 118 and rear wheels 120.

The two side tube portions 114 can extend at least partially parallel to each other at a left and a right side of the base frame 102. The footrest 116 can be fixedly connected with the two side tube portions 114 at a front of the base frame 102. The front and rear wheels 118 and 120 can be respectively assembled with the base frame 102 at a front and a rear of the two side tube portions 114. Moreover, the base frame 102 may further include a stand platform 122, which is disposed at a rear of the two side tube portions 114. In some construction, the base frame 102 may further have an adjustable structure with the stand platform 122 movable relative to the side tube portions 114 for expanding or shortening the base frame 102, the base frame 102 being expandable to receive a child seat (not shown) above the stand platform 122.

Referring to FIGS. 1 and 2, the leg portions 106 and 108 can be respectively disposed symmetrically at a left and a right side of the child stroller apparatus 100. Any of the leg portions 106 and 108 can include, e.g., rigid tubular segments. The two leg portions 106 can be respectively connected pivotally with the base frame 102 at a left and right side of the footrest 116. For example, each leg portion 106 can have a lower end pivotally connected with the base frame 102 about a pivot connection 124, whereby the leg portions 106 are rotatable relative to the base frame 102 about a pivot axis defined by the pivot connection 124 extending transversally from a left to a right side.

The two leg portions 108 can be respectively connected pivotally with the base frame 102 in an intermediate region between the front wheels 118 and the rear wheels 120. For example, each leg portion 108 can have a lower end that is pivotally connected with one corresponding side tube portion 114 of the base frame 102 at a position between the front wheels 118 and the rear wheels 120. The leg portions 108 are thereby rotatable relative to the base frame 102 about a pivot axis extending transversally from a left to a right side of the child stroller apparatus 100.

Referring to FIGS. 1 and 2, the handle frame 110 can include two side segments 110A and a transversal segment 110B connected with each other. The two side segments 110A can be disposed symmetrically at the left and right side of the child stroller apparatus 100. The transversal segment 110B may be telescopically assembled with the two side segments 110A, so that the length of the handle frame 110 may be modified by sliding the transversal segment 110B relative to the two side segments 110A. The transversal segment 110B thereby can be extended from the side segments 110A to increase the length of the handle frame 110 in an unfolded state for use, and retracted partially into the side segments 110A to reduce the length of the handle frame 110 in a folded state for convenient storage. A latch mechanism (not shown) may be assembled with the handle frame 110 to lock it in the extended and retracted state. This latch mechanism may be unlocked with two release actuators 125 respectively disposed on the left and right sides of the handle frame 110.

At each of the left and right sides, the side segment 110A of the handle frame 110 can be respectively connected pivotally with one leg portion 106 and one leg portion 108. For example, the joint structure 112 connecting the side segment 110A with the leg portion 106 can include a coupling member 126 fixedly attached to a lower end of one side segment 110A, another coupling member 128 fixedly attached to an upper end of one leg portion 106, and a pivot connection 130 that pivotally connect the coupling member 126 with the coupling member 128. Each of the coupling members 126 and 128 can be exemplary made of metal or plastics materials, and the pivot connection 130 may exemplary include a shaft portion, a rivet and the like. Each side segment 110A of the handle frame 110 is thereby coupled with one corresponding leg portion 106 via the pivot connection 130, which defines a pivot axis extending transversally from a left to a right side of the child stroller apparatus 100.

Moreover, each side segment 110A can be fixedly connected with a linking arm 132 that is pivotally connected with the corresponding leg portion 108 via a pivot connection 133, which may include a shaft portion, a rivet and the like. For example, the linking arm 132 can be fixedly attached to the coupling member 126 at a location offset from the pivot axis about which the handle frame 110 rotates relative to the leg portions 106, and can be pivotally connected with an upper end of one corresponding leg portion 108 via the pivot connection 133. With this construction, the handle frame 110 can respectively rotate relative to the leg portions 106 and the leg portions 108 about two different pivot axes for unfolding or collapsing the child stroller apparatus 100.

Referring to FIGS. 1 and 2, two seat mounts 134 can be respectively assembled slidably with the two leg portions 106. For example, each seat mount 134 may include a sleeve 136, and the leg portion 106 is slidably assembled through the sleeve 136, whereby the seat mount 134 can slide along the leg portion 106. The two seat mounts 134 are disposed symmetrically on the two leg portions 106 and are configured to detachably fasten to a removable child seat 200 (better shown in FIG. 5), which may be a stroller seat or an infant car seat. For example, each seat mount 134 may have a socket and/or a protruding portion that can engage and fasten with a corresponding structure provided on the child seat 200, when the child seat 200 is installed on the seat mounts 134. According to some examples of implementation, each seat mount 134 may further have a construction allowing adjustment of the seat mount 134 between a deployed position where it projects upward for receiving the installation of the child seat 200, and a stowed position where the seat mount 134 lies down generally horizontally to facilitate storage.

At each of the left and right sides, a linkage 140 is respectively connected with the side segment 110A of the handle frame 110 and the seat mount 134. The linkage 140 can be a unitary part having an elongate shape, which can include, without limitation, a bar, a rod, a plate, and the like. The linkage 140 can have a first end pivotally coupled with the side segment 110A of the handle frame 110 via a pivot connection 142, and a second end pivotally coupled with the seat mount 134 via a pivot connection 144 (better shown in FIG. 3). The two pivot connections 142 and 144 can include, e.g., shaft portions, rivets and the like, which can define two pivot axes extending transversally about which the side segment 110A and the seat mount 134 can respectively rotate relative to the linkage 140. In this manner, unison sliding of the two seat mounts 134 along the leg portions 106 is linked to rotational displacement of the handle frame 110 about the pivot connections 130 relative to the leg portions 106. More specifically, a rotation of the handle frame 110 relative to the leg portions 106 for unfolding the child stroller apparatus 100 causes the seat mounts 134 to respectively slide along the leg portions 106 toward the pivot connections 130, and a rotation of the handle frame 110 relative to the leg portions 106 for collapsing the child stroller apparatus 100 causes the seat mounts 134 to respectively slide along the leg portions 106 away from the pivot connections 130. Accordingly, each seat mount 134 can occupy a first position on the leg portion 106 near the pivot connection 130 when the child stroller apparatus 100 is in an unfolded state for use (as shown in FIG. 1), and a second position on the leg portion 106 away from the pivot connection 130 when the child stroller apparatus 100 is folded to a collapsed state (as shown in FIG. 3).

Referring again to FIGS. 1-3, each leg portion 106 can further be respectively assembled with an impeding part 146. The impeding part 146 can be disposed in an intermediate position on the leg portion 106 between the pivot connections 124 and 130. According to an example of construction, the impeding part 146 may be shaped as a knob or tab. The impeding part 146 can be slidably connected with the leg portion 106, and can have a pass and a blocking state. The impeding part 146 can retract toward an interior of the leg portion 106 in the pass state to allow sliding movement of the seat mount 134 past the impeding part 146 as the child stroller apparatus 100 is movably switched between the collapsed and unfolded state, and can protrude outward the leg portion 106 in the blocking state to prevent undesirable movement of the seat mount 134 from the second position (i.e., corresponding to the collapsed state of the child stroller apparatus 100) to the first position (i.e., corresponding to the unfolded state of the child stroller apparatus 100). As shown, the impeding part 146 may be disposed on the leg portion 106 in an intermediate position between the first and second positions of the seat mount 134.

Figure 4:
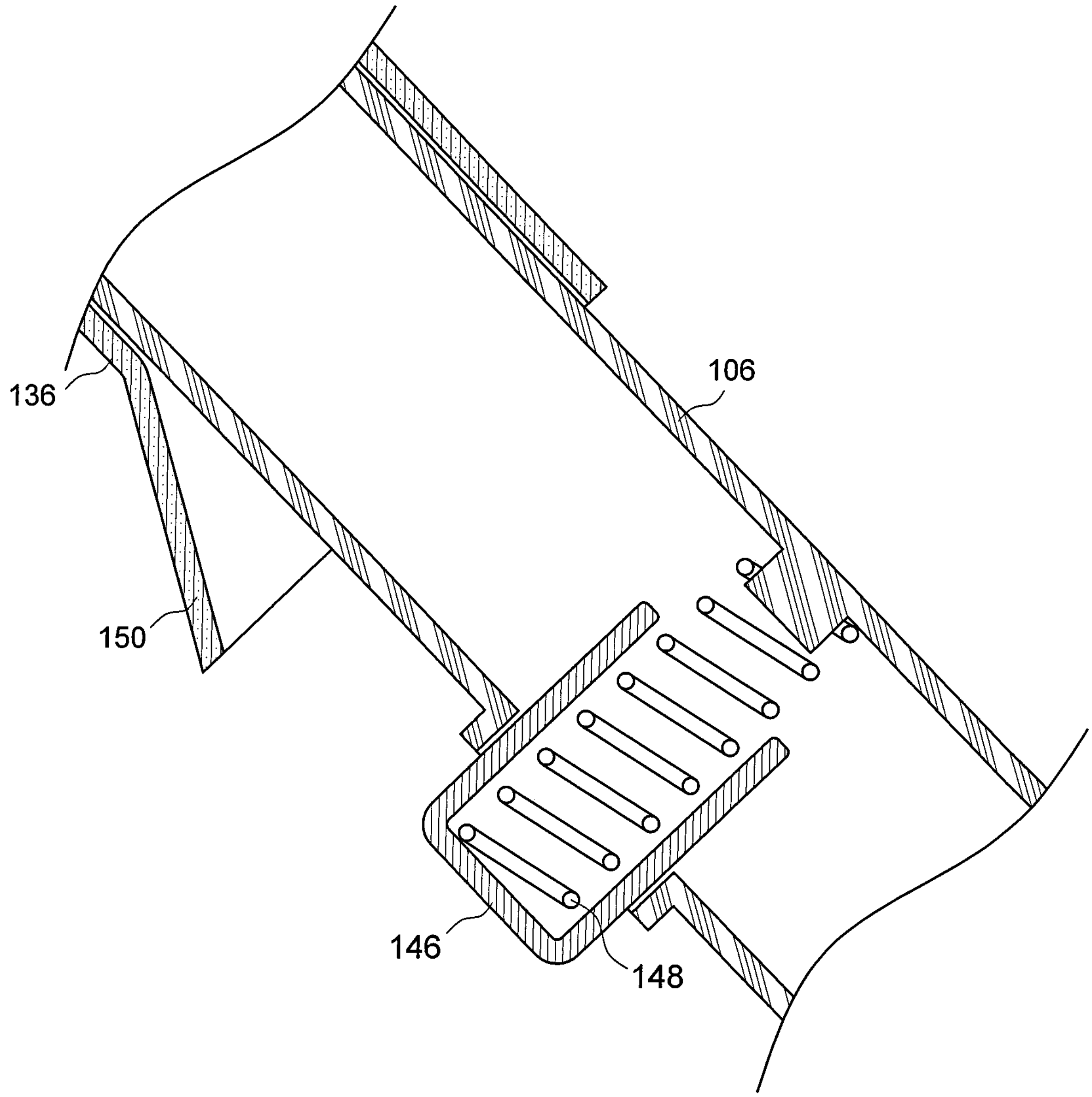
FIG. 4 is a cross-sectional view illustrating the assembly of an impeding part on one leg portion of the child stroller apparatus shown in FIG. 1.

In conjunction with FIGS. 1-3, FIG. 4 is a cross-sectional view illustrating the assembly of the impeding part 146 on one leg portion 106. Referring to FIG. 4, the impeding part 146 may be slidably assembled through an opening in the leg portion 106 for inward and outward sliding movement between the pass and blocking states. The impeding part 146 may be connected with a spring 148 operable to bias the impeding part 146 toward the blocking state. For example, the spring 148 may be a compression spring having two ends respectively connected with the impeding part 146 and an inner anchoring feature inside the leg portion 106. The spring 148 can thereby bias the impeding part 146 to protrude outward the leg portion 106.

The child stroller apparatus 100 may be switched between the unfolded and collapsed state with or without a child seat installed on the seat mounts 134. Exemplary operation of the child stroller apparatus 100 with no child seat installed on the seat mounts 134 is described hereinafter with reference to FIGS. 1-4. Referring to FIG. 1, the child stroller apparatus 100 is shown in an unfolded state for use. In the unfolded state, the base frame 102 extends generally horizontally, the leg portions 106 and 108 erect upward from the base frame 102, and the side segment 110A of the handle frame 110 and the leg portion 106 at each of the left and right sides extend generally along a same axis. Moreover, the seat mount 134 on each of the left and right sides can remain in a first position adjacent to the pivot connections 130 and 133, and the linkage 140 can extend across the joint structure 112 with the pivot connections 142 and 144 of the linkage 140 respectively located above and below the pivot connection 130 that couples the side segment 110A with the leg portion 106.

Referring to FIG. 2, the handle frame 110 can be rotationally folded forward onto the leg portions 106 for collapsing the child stroller apparatus 100. Owing to the coupling of the linkages 140, the folding rotation of the handle frame 110 can urge the seat mounts 134 to slide in unison along the leg portions 106 away from the pivot connections 130 and toward the pivot connections 124. As they slide along the leg portions 106, the seat mounts 134 can respectively come into contact with the impeding parts 146, and respectively urge the impeding parts 146 to retract toward the interior of the leg portions 106. For facilitating inward retraction of the impeding parts 146, each seat mount 134 can have a ramp 150 that can come in sliding contact with and push the impeding part 146 inward against the biasing action of the spring 148 (shown in FIG. 4), the ramp 150 being exemplary provided on the sleeve 136 of the seat mount 134. It will be readily appreciated that alternate constructions may provide the ramp on the impeding part 146 rather than on the seat mount 134 for achieving the same function. The impeding parts 146 can thereby switch from the blocking state to the pass state for passage of the seat mounts 134 past the impeding parts 146. After the seat mounts 134 have traveled past the impeding parts 146, the springs 148 can respectively urge the impeding parts 146 to protrude outward for recovering the blocking state.

Referring to FIG. 3, once the child stroller apparatus 100 is in the collapsed state, the side segments 110A of the handle frame 110, the leg portions 106 and the side tube portions 114 of the base frame 102 can be generally parallel to one another with the leg portions 106 positioned between the base frame 102 and the side segments 110A. Moreover, the pivot connection 130 coupling the handle frame 110 with the leg portion 106 at each of the left and right sides can be displaced from a first side of the linkage 140 to a second side of the linkage 140 opposite to the first side when the child stroller apparatus 100 is switched from the unfolded state to the collapsed state, the linkage 140 in the collapsed state being positioned in a region between the pivot connections 124 and 130. In the collapsed state, each of the seat mounts 134 can be in a second position abutting against the impeding part 146, which protrudes outward and is in the blocking state for preventing sliding of the seat mount 134 along the leg portion 106 toward the pivot connection 130. The impeding parts 146 can thereby act as a storage lock that can keep the child stroller apparatus 100 in the collapsed state and prevent its inadvertent unfolding.

In order to unfold the child stroller apparatus 100, a caregiver first presses the impeding parts 146 inward so that they are switched to the pass state. Then the child stroller apparatus 100 can be unfolded, e.g., by rotating the handle frame 110 about the pivot connections 130 away from the leg portions 106. As a result, the seat mounts 134 can concurrently slide in unison past the impeding parts 146 toward the pivot connections 130. The child stroller apparatus 100 can thereby recover the unfolded state shown in FIG. 1.

Figure 5:
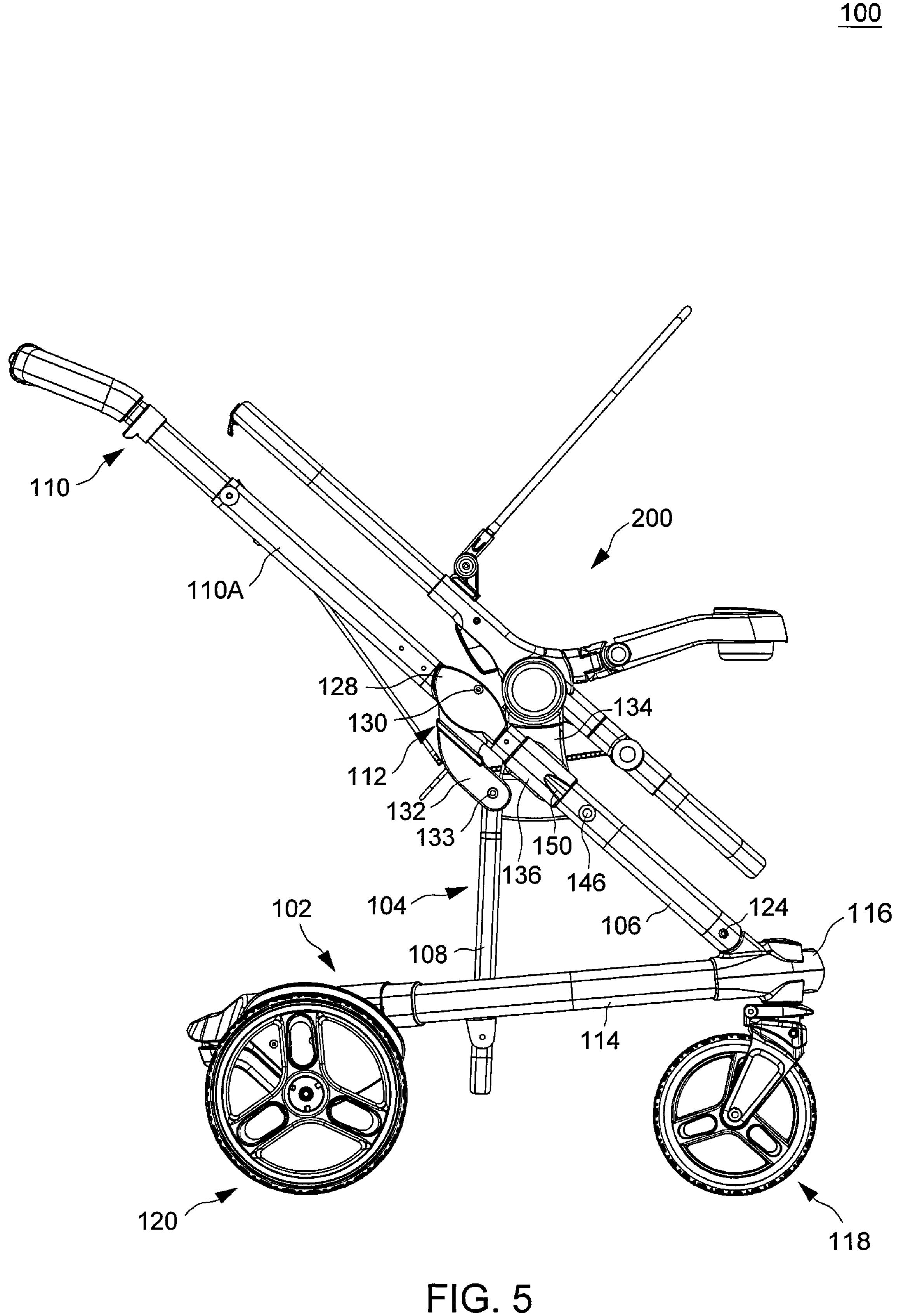
FIG. 5 is a side view illustrating the child stroller apparatus in an unfolded state for use with a detachable child seat installed thereon.
Figure 6:
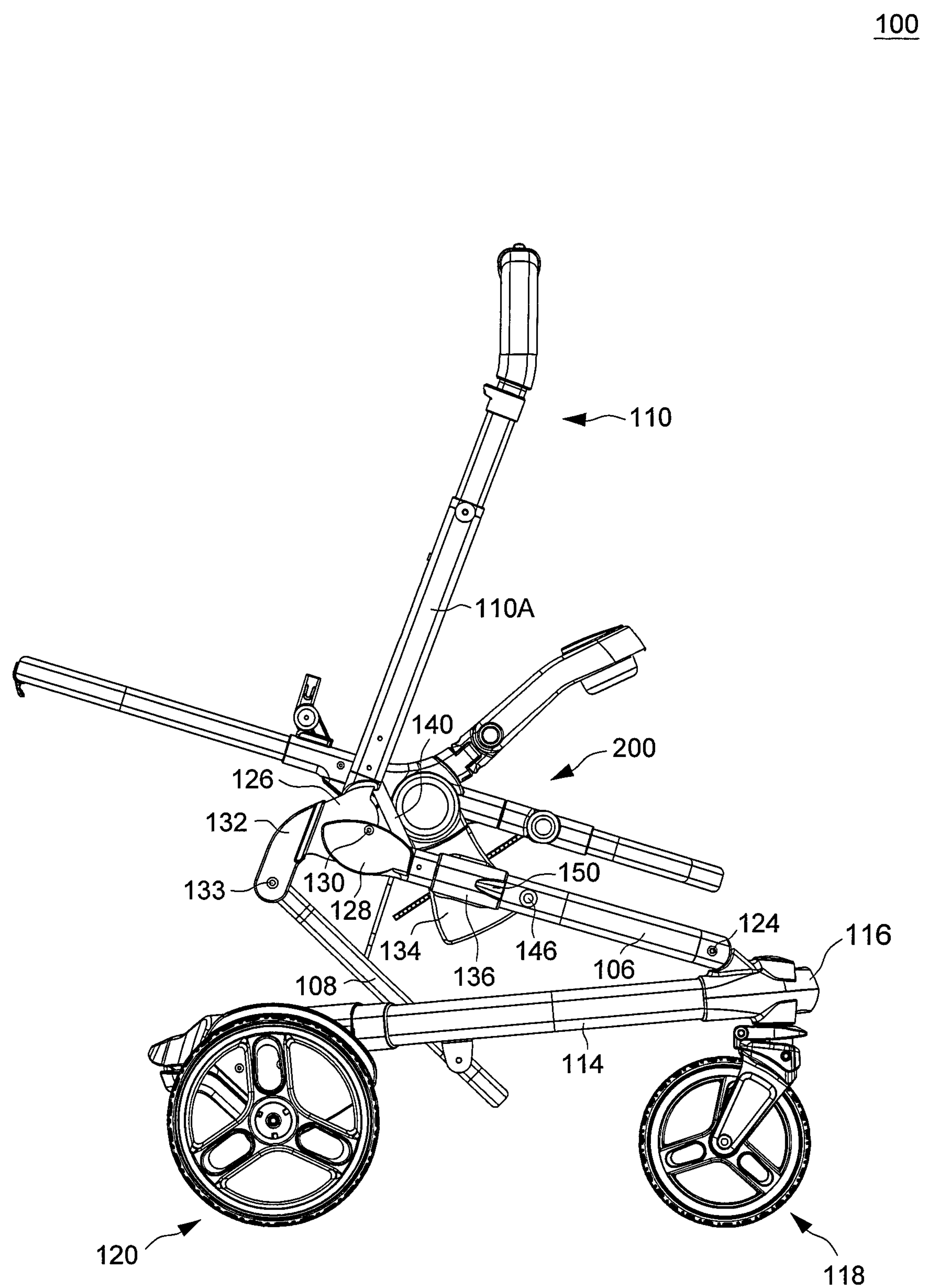
FIG. 6 is a side view illustrating the child stroller apparatus with the detachable child seat installed thereon in an intermediate state between the unfolded state and the collapsed state.
Figure 7:
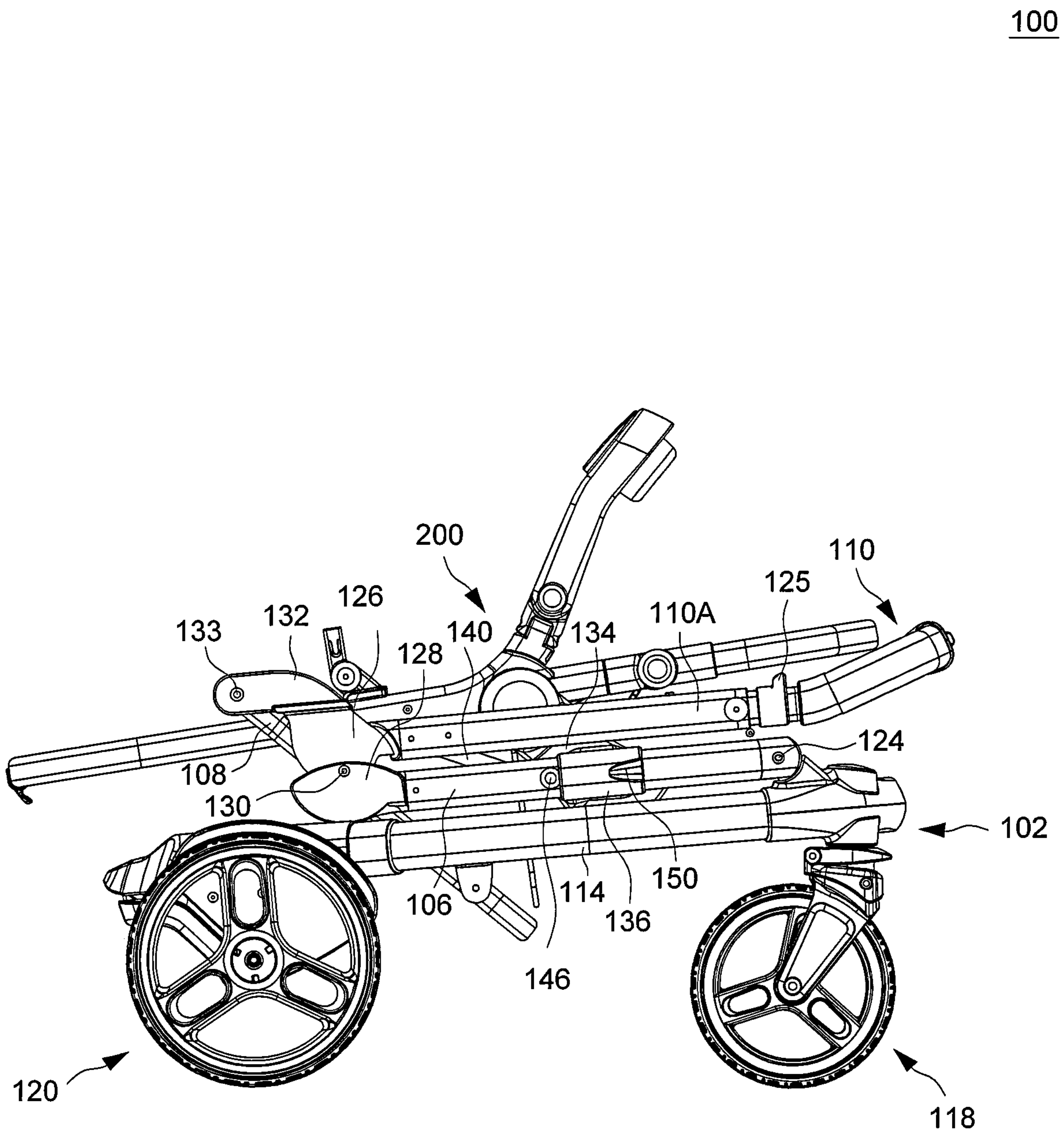
FIG. 7 is a side view illustrating the child stroller apparatus with the detachable child seat installed thereon in the collapsed state.

FIGS. 5-7 are schematic views illustrating exemplary operation of the child stroller apparatus 100 with a child seat 200 installed on the seat mounts 134. Since the child seat 200 is fastened to the seat mounts 134, the linkages 140 can be operatively connected with the child seat 200 via the seat mounts 134. In FIG. 5, the child stroller apparatus 100 is shown in the unfolded state. Like previously described, the child seat 200 and the seat mount 134 on each of the left and right sides can remain in a first position on the leg portion 106 adjacent to the pivot connections 130 and 133, and the linkage 140 (shown in FIGS. 2 and 3) on each of the left and right sides can extend across the joint structure 112 with the pivot connections 142 and 144 of the linkage 140 respectively located above and below the pivot connection 130 that couples the side segment 110A with the leg portion 106.

Referring to FIGS. 6, the handle frame 110 can be rotationally folded forward onto the leg portions 106 for collapsing the child stroller apparatus 100 with the child seat 200 installed thereon. Like previously described, the folding rotation of the handle frame 110 can urge the seat mounts 134 and the child seat 200 to slide in unison along the leg portions 106 away from the pivot connections 130 and toward the pivot connections 124, owing to the coupling of the linkages 140. As they slide along the leg portions 106, the seat mounts 134 can respectively come into contact with the impeding parts 146, and respectively urge the impeding parts 146 to retract toward the interior of the leg portions 106. The impeding parts 146 can thereby switch from the blocking state to the pass state for passage of the seat mounts 134 and the child seat 200 past the impeding parts 146.

Referring to FIG. 7, once the child stroller apparatus 100 is in the collapsed state, the side segments 110A of the handle frame 110, the leg portions 106, the linkages 140 and the side tube portions 114 of the base frame 102 can be positioned like described previously. Moreover, the child seat 200 and the seat mounts 134 can be in a second position on the leg portions 106 where the seat mounts 134 can respectively abut against the impeding parts 146, which protrude outward and are in the blocking state for preventing sliding of the child seat 200 along the leg portions 106 toward the pivot connections 130 back to the first position. The impeding parts 146 can thereby act as a storage lock that can keep the child stroller apparatus 100 in the collapsed state and prevent its inadvertent unfolding. The displacement of the child seat 200 along the leg portions 106 allows a more compact size of the child stroller apparatus 100 in the collapsed state.

For unfolding the child stroller apparatus 100, a caregiver first presses the impeding parts 146 inward so that they are switched to the pass state. Then the child stroller apparatus 100 can be unfolded, e.g., by rotating the handle frame 110 about the pivot connections 130 away from the leg portions 106. As a result, the seat mounts 134 and the child seat 200 can slide in unison along the leg portions 106 past the impeding parts 146 toward the pivot connections 130. The child stroller apparatus 100 can thereby recover the unfolded state shown in FIG. 5.

Figure 8:
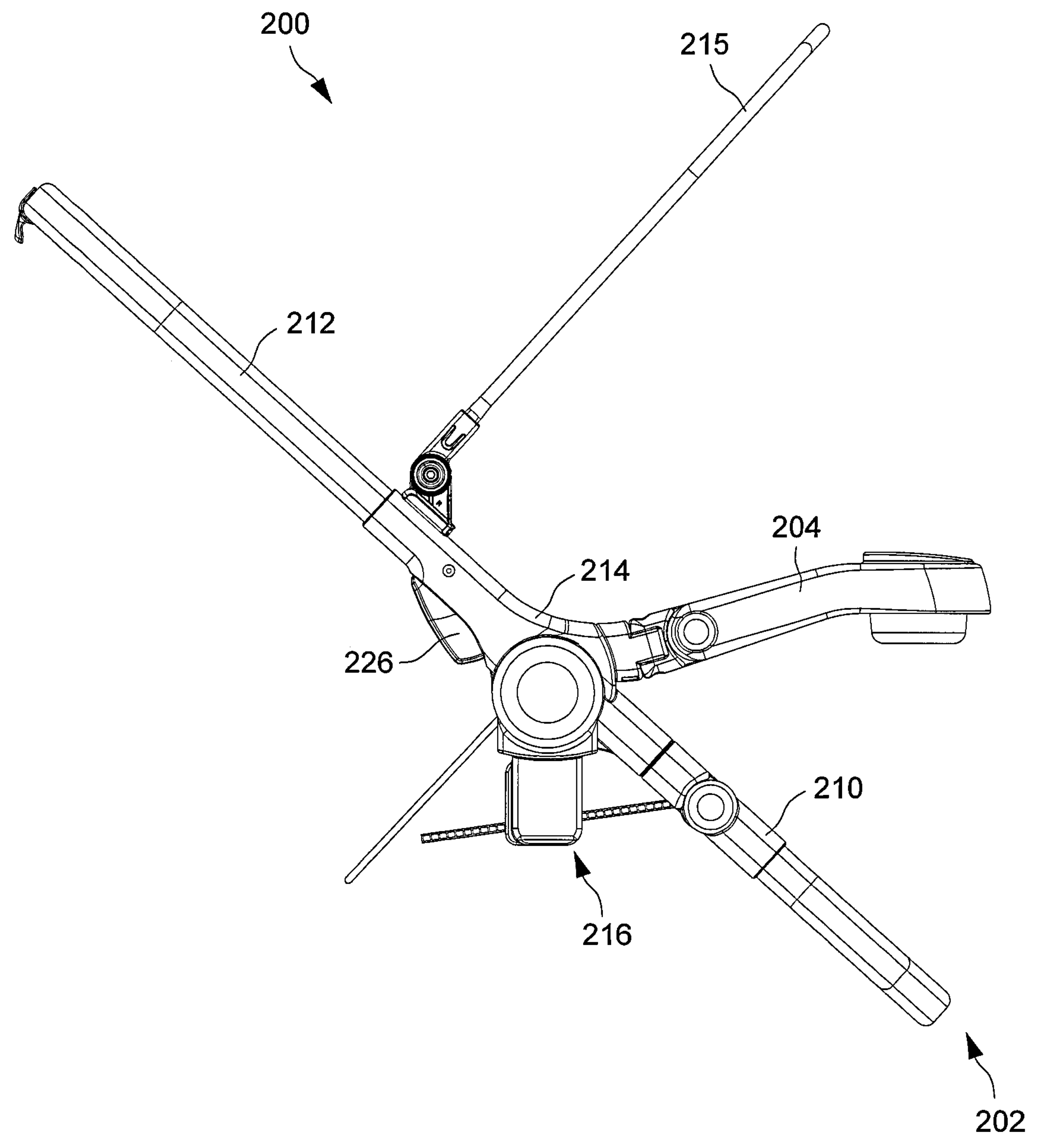
FIG. 8 is a side view illustrating an child seat installable on the child stroller apparatus shown in FIG. 1.
Figure 9:
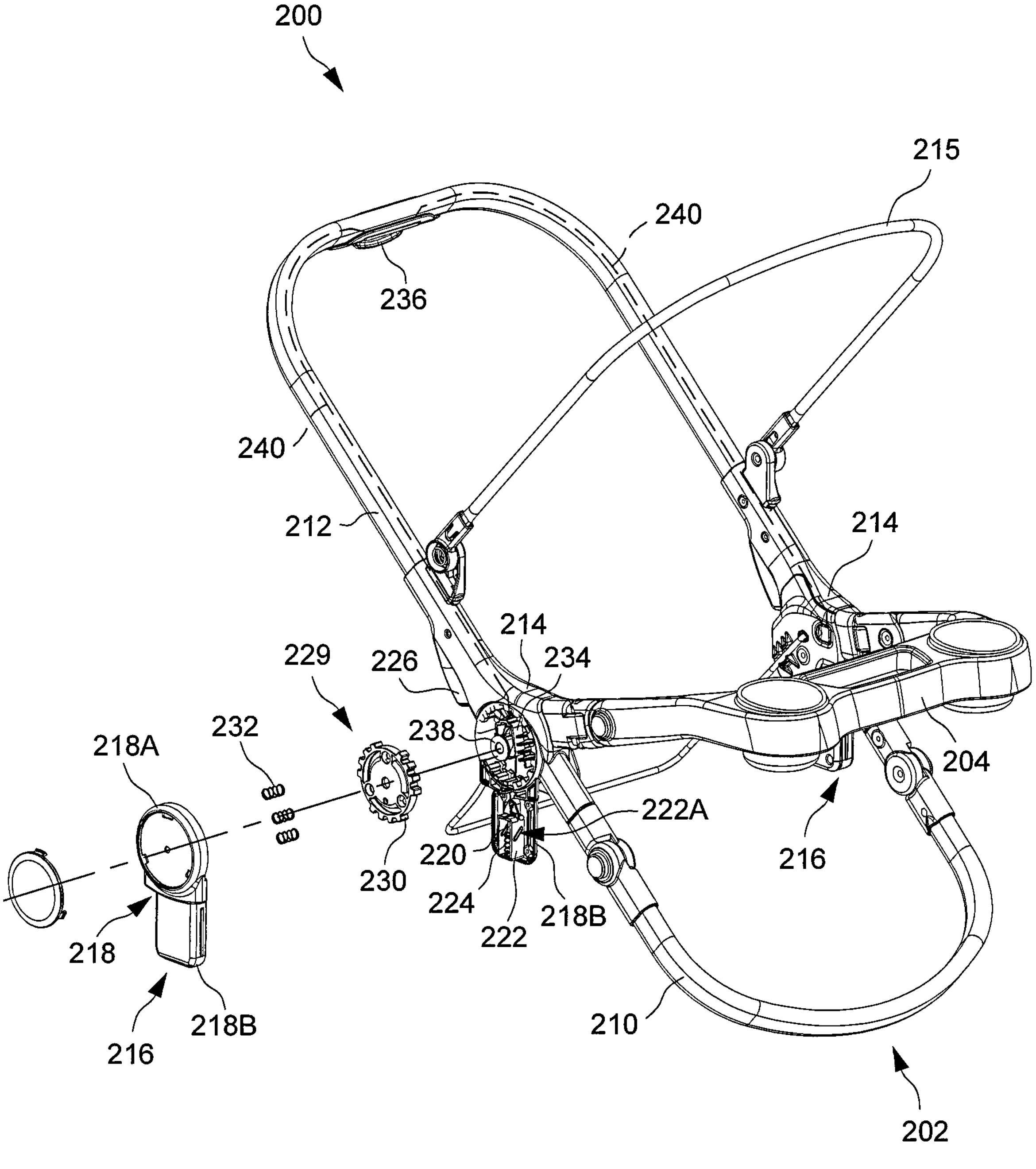
FIG. 9 is a partially exploded view illustrating some construction details of a connector provided in the child seat shown in FIG. 8.

FIGS. 8 and 9 are respectively a side and a partially exploded view illustrating an example of construction for the child seat 200. The child seat 200 can be a stroller seat, and include a seat frame 202 and a tray 204 connected with each other. According to an example of construction, the seat frame 202 can include two frame portions 210 and 212, and two side coupling parts 214. Each of the two frame portions 210 and 212 can exemplary have a generally U-shape comprised of a tubular assembly. The frame portion 210 can be a lower frame portion close to a leg rest region of the child seat 200, and the frame portion 212 can be an upper frame portion close to a backrest region of the child seat 200. The two frame portions 210 and 212 are fixedly connected with each other at the left and right sides via the two side coupling parts 214 so as to define a closed shape for attachment of a softgoods material adapted to provide sitting support. Moreover, the seat frame 202 may be assembled with a canopy frame 215, which may be exemplary connected pivotally with the side coupling parts 214. The tray 204 can be a front tray, and can be fixedly connected with the side coupling parts 214 at the left and right sides of the child seat 200.

Referring to FIGS. 8 and 9, the left and right sides of the seat frame 202 can be respectively assembled with two connectors 216 operable to engage with the seat mounts 134 (shown in FIG. 1) when the child seat 200 is installed on the child stroller apparatus 100. The two connectors 216 can be respectively connected pivotally with the two side coupling parts 214, so that the seat frame 202 is rotatable relative to the connectors 216 for converting the child seat 200 between different configurations of use, such as a bassinet or a seat configuration.

Figure 10:
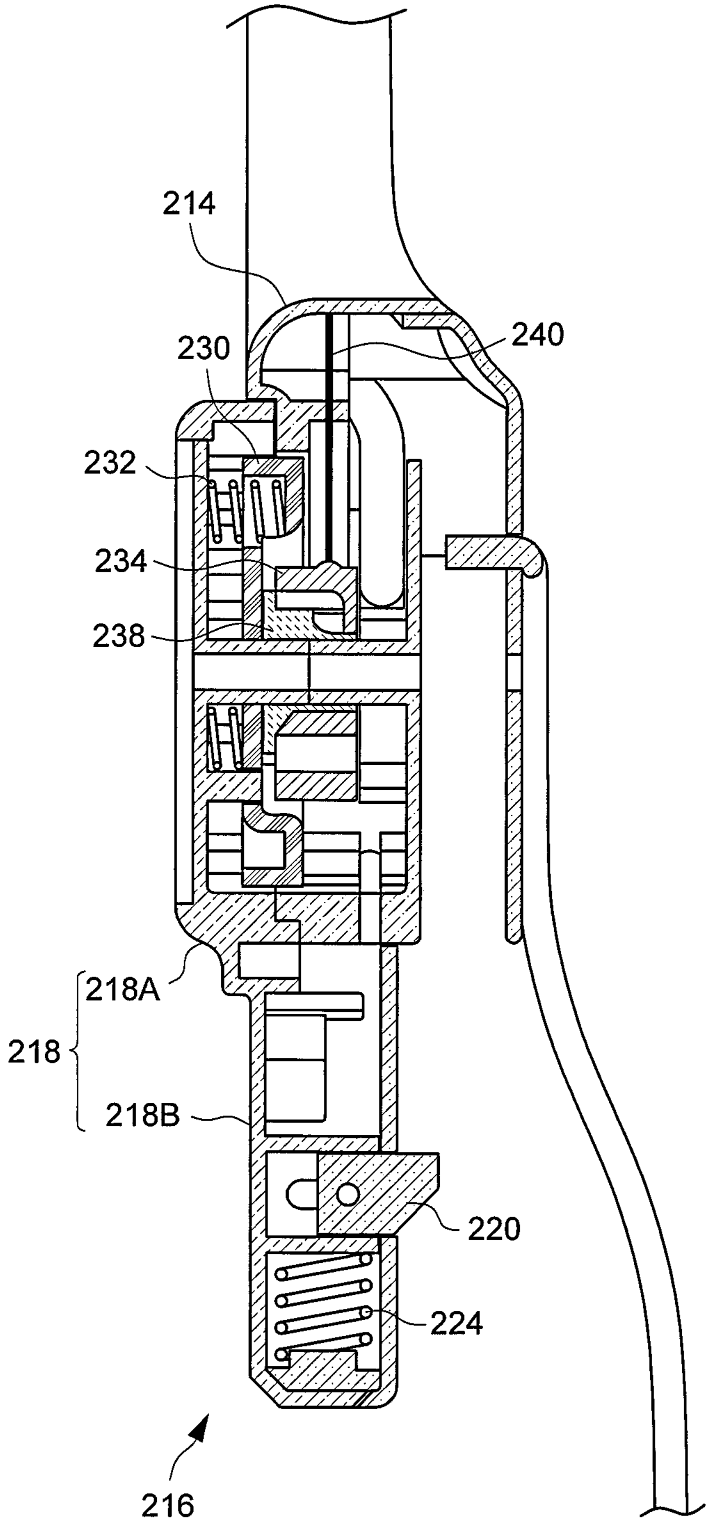
FIG. 10 is a schematic cross-sectional view illustrating construction details of one connector provided in the child seat shown in FIG. 8, which include a latch shown in a locking state.

In conjunction with FIG. 9, FIG. 10 is a schematic cross-sectional view illustrating further construction details of one connector 216. Referring to FIGS. 8-10, the two connectors 216 can have a similar construction, each of which including a housing 218 having a coupling portion 218A and an insert portion 218B. The coupling portion 218A of the housing 218 can be pivotally connected with the side coupling part 214. The insert portion 218B of the housing 218 can have a hollow interior in which is slidably assembled a locking member 220. When the child seat 200 is installed on the child stroller apparatus 100, the insert portion 218B of the housing 218 can be inserted into a socket of one seat mount 134, and the locking member 220 can engage with the seat mount 134 for fixedly attaching the child seat 200.

Referring to FIGS. 9 and 10, the locking member 220 may be connected with a driving member 222, which is assembled with the insert portion 218B of the housing 218 for sliding movement generally perpendicular to the sliding axis of the locking member 220. For example, the driving member 222 may include a guide slot 222A, and the locking member 220 may have a pin slidably assembled through the guide slot 222A. The driving member 222 is thereby movable in a first direction to drive an unlocking displacement of the locking member 220, and in a second direction opposite to the first direction to drive a locking displacement of the locking member 220. The driving member 222 may be biased for movement in the second direction by a spring 224, which can have two opposite ends respectively connected with the driving member 222 and an inner wall in the insert portion 218B. Moreover, the driving member 222 may be connected with a release button 226 via a cable (not shown), the release button 226 being assembled with the side coupling part 214. The release button 226 can be operable to urge the driving member 222 to slide in the first direction and thereby cause an unlocking displacement of the locking member 220.

Depending on the needs, the child seat 200 may be installed on the child stroller apparatus 100 in different configurations of use. In particular, the seat frame 202 may be rotated relative to the connectors 216 for converting the child seat 200 between the different configurations of use, e.g., the seat frame 202 may be disposed in a first position where it lies generally horizontal corresponding to a bassinet configuration, or a second position where it is inclined an angle for receiving a child in a sitting position.

Figure 11:
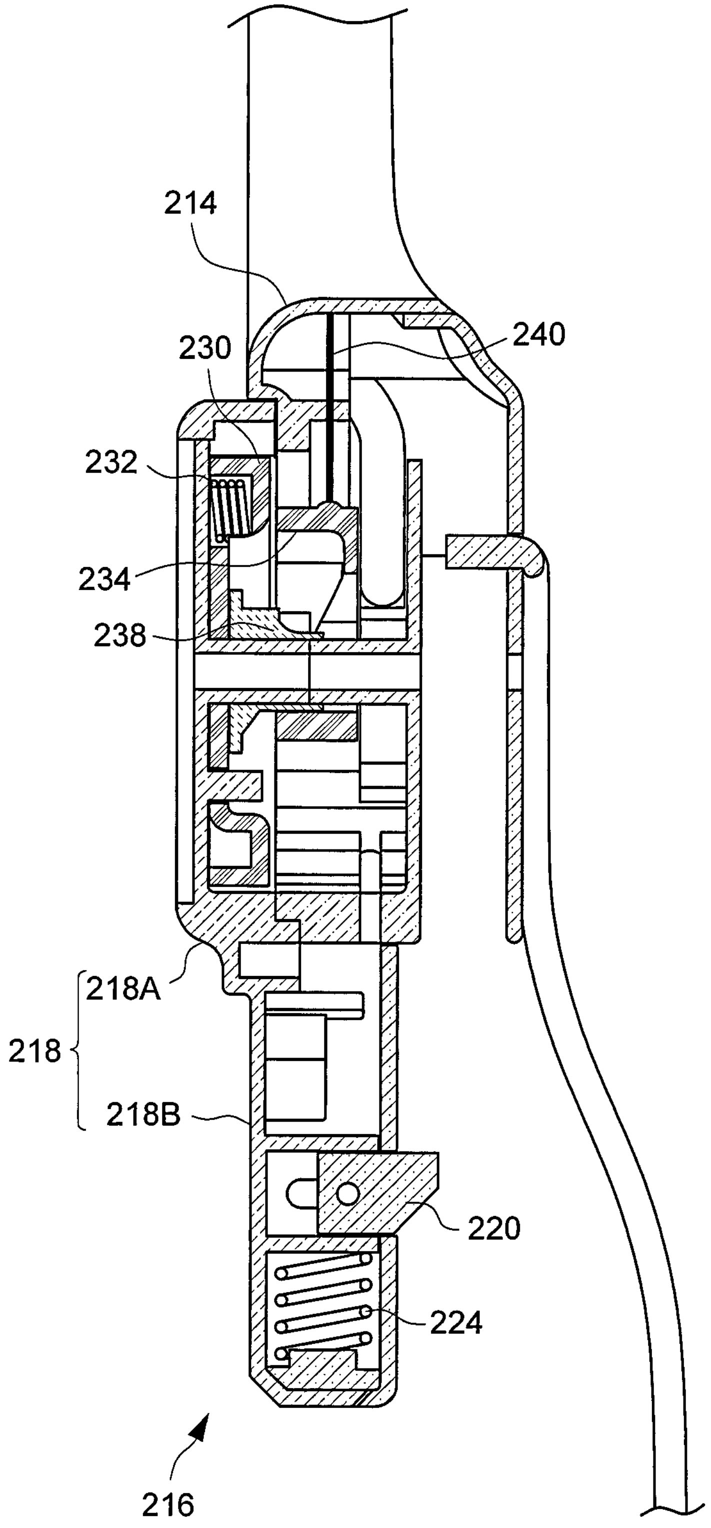
FIG. 11 is a schematic cross-sectional view illustrating the latch provided in the connector in an unlocking state.

Referring again to FIGS. 9 and 10, for rotationally locking the seat frame 202 in a desirable configuration of use (e.g., bassinet or seat configuration), the child seat 200 can further include a lock mechanism 229 respectively disposed adjacent to the connector 216 at each of the left and right sides. The lock mechanism 229 can include a latch 230, one or more spring 232, a driving part 234 and a release actuator 236. The latch 230 can have a circumference provided with a plurality of teeth, and can be disposed in a cavity delimited at least partially by the side coupling part 214 and the coupling portion 218A of the housing 218. The latch 230 can be assembled for sliding movement between a locking position and an unlocking position along the pivot axis of the seat frame 202 relative to the connector 216. FIGS. 10 and 11 are schematic cross-sectional views respectively illustrating the latch 230 in the locking and unlocking positions. In the locking position, the latch 230 can engage with teeth respectively provided in the side coupling part 214 and the coupling portion 218A of the housing 218 of the connector 216, thereby rotationally locking the side coupling part 214 and seat frame 202 with respect to the connector 216. In the unlocking position, the latch 230 can disengage from the teeth of the side coupling part 214 for rotation of the side coupling part 214 and seat frame 202 relative to the connector 216.

Referring again to FIGS. 9-11, the springs 232 can be respectively connected with the latch 230 and the coupling portion 218A of the housing 218, and can bias the latch 230 for locking engagement with the side coupling part 214.

The driving part 234 can be assembled for sliding movement generally perpendicular to the axis of movement of the latch 230, and can urge the latch 230 to move in a direction for disengaging from the side coupling part 214 via a sliding contact between ramp surfaces. For example, the driving part 234 may be in sliding contact with a ramp element 238, which can slide along the same axis as the latch 230 and can be in contact with the latch 230. While the ramp element 238 is illustrated as being a distinct part from the latch 230, it will be appreciated that an alternate construction may form the latch 230 and the ramp element 238 as an integral single part.

The release actuator 236 may be assembled with a transversal segment of the frame portion 212, and may be operable to concurrently switch the latch 230 at each of the left and right sides from the locking state to the unlocking state. According to an example of construction, the release actuator 236 can be operatively connected with the latch 230 at each of the left and right sides via a cable 240. More specifically, each cable 240 can have two opposite ends respectively connected with the release actuator 236 and the driving part 234 associated therewith. When it is operated, the release actuator 236 can thereby pull the driving part 234 to slide for urging the latch 230 to move and disengage from the side coupling part 214 such that the seat frame 202 can rotate relative to the connector 216.

Figure 12:
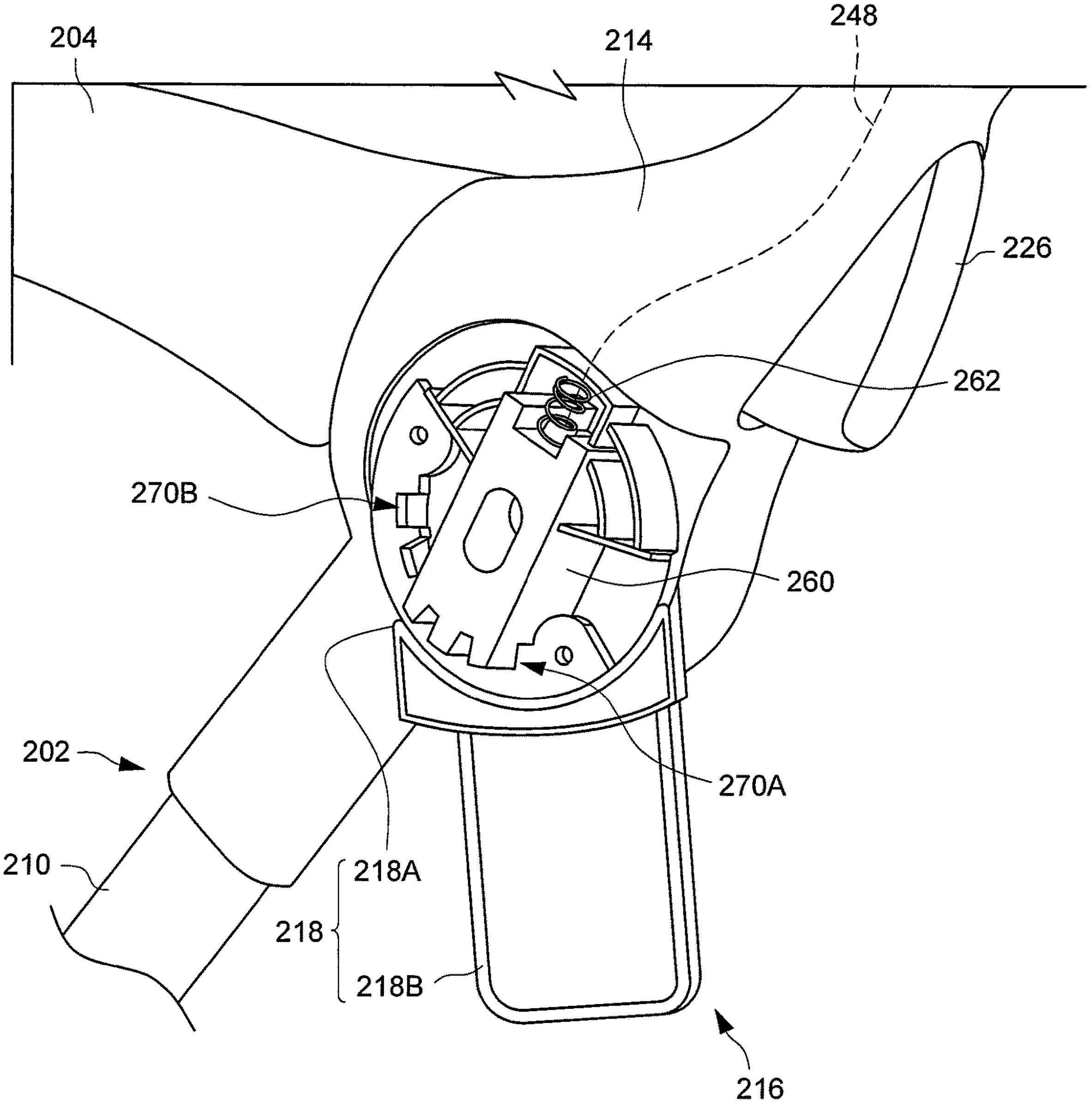
FIG. 12 is a schematic view illustrating a variant construction of a lock mechanism for rotationally locking the seat frame in a desirable configuration of use with respect to the connector.

FIG. 12 is a schematic view illustrating a variant construction of a lock mechanism for rotationally locking the seat frame 202 in a desirable configuration of use (e.g., bassinet or seat configuration) with respect to the connector 216 at each of the left and right sides. The lock mechanism shown in FIG. 12 can include a latch 260 and a spring 262. The latch 260 can be disposed in a cavity delimited at least partially by the side coupling part 214 and the coupling portion 218A of the housing 218. The latch 260 can be assembled with the side coupling part 214 for sliding movement radially relative to the pivot axis of the seat frame 202 between a locking and an unlocking position. In the locking position, the latch 260 can engage with any one of multiple grooves 270A and 270B provided in the coupling portion 218A of the housing 218, thereby rotationally locking the side coupling part 214 and seat frame 202 with respect to the connector 216. For example, the engagement of the latch 260 with the groove 270A can lock the seat frame 202 in a seat configuration, and the engagement of the latch 260 with the groove 270B can lock the seat frame 202 in a bassinet configuration. In the unlocking position, the latch 260 can disengage from the grooves 270A and 270B for rotation of the side coupling part 214 and seat frame 202 relative to the connector 216.

As shown in FIG. 12, the spring 262 can be respectively connected with the latch 260 and the side coupling part 214, and can bias the latch 260 for locking engagement with any of the grooves 270A and 270B provided in the connector 216. Moreover, the latch 260 can be operatively connected with a release actuator (such as the release actuator 236 previously described) via the cable 248. When it is operated, the release actuator can pull the latch 260 to slide and disengage from the grooves 270A and 270B such that the seat frame 202 and the latch 260 can rotate relative to the connector 216 for adjustment between the different configurations of use.

Figure 13:
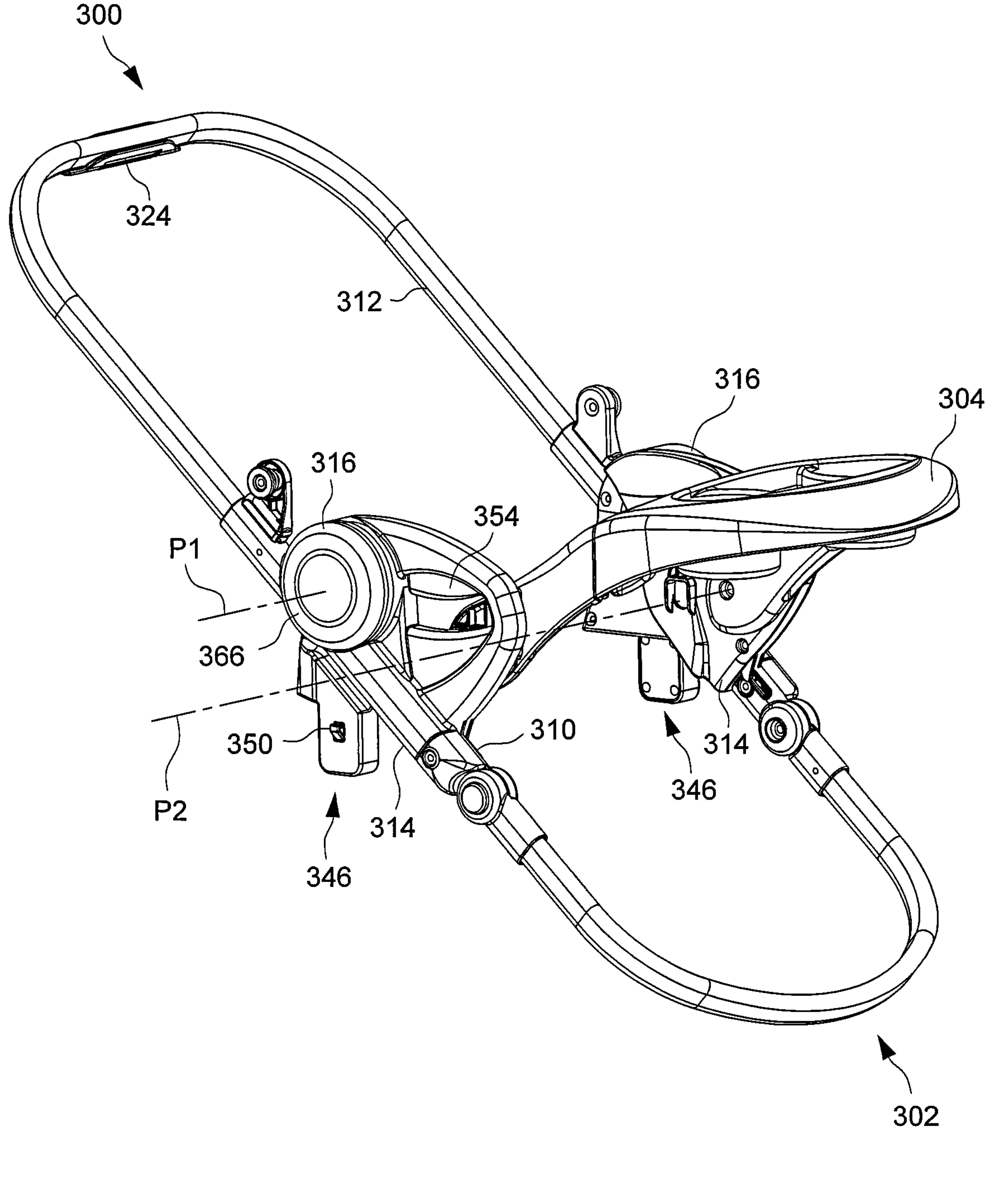
FIG. 13 is a perspective view illustrating the construction of another child seat that may be installed on the seat mounts of the child stroller apparatus shown in FIG. 1.
Figure 14:
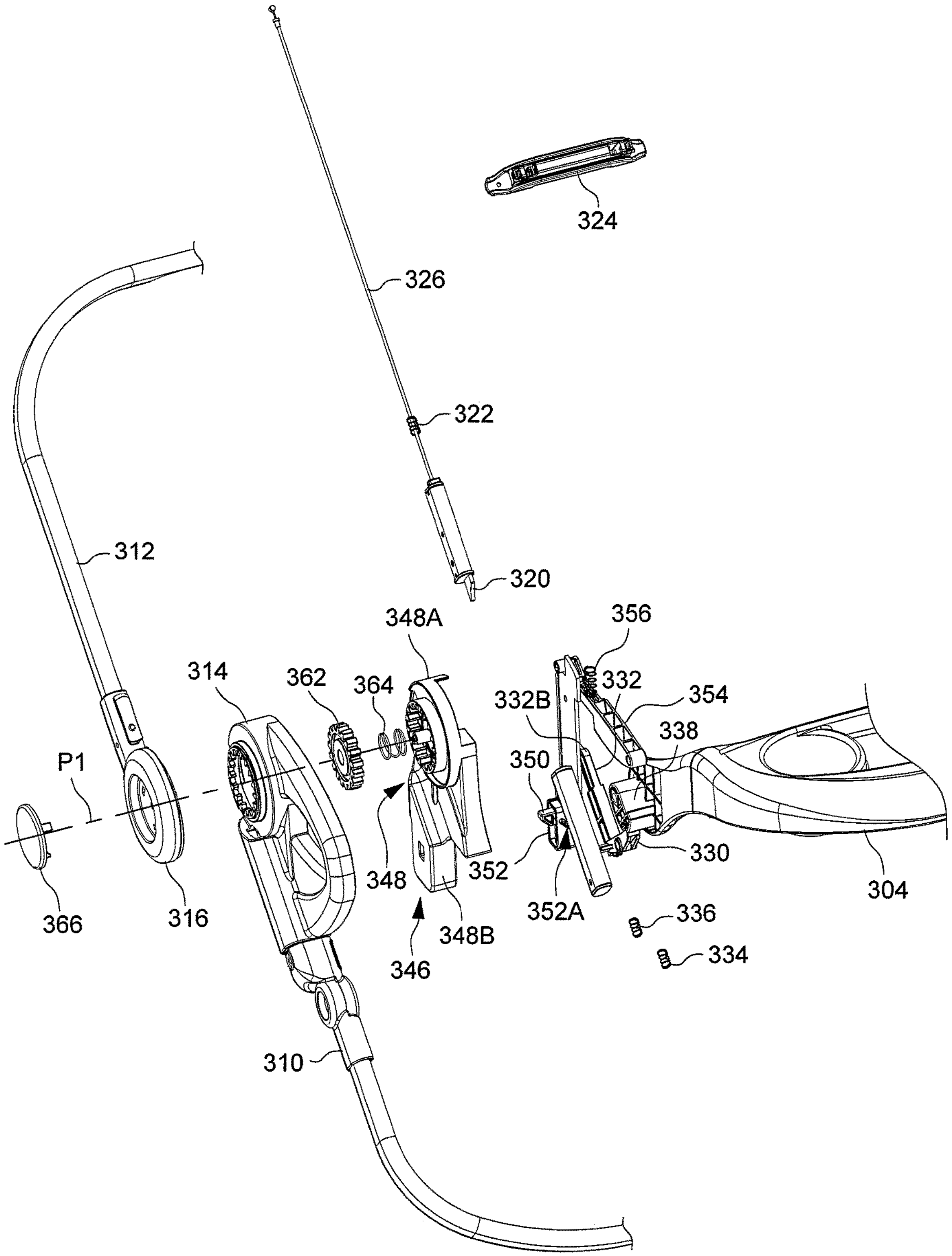
FIG. 14 is a partially exploded view illustrating the construction of the child seat shown in FIG. 13.

FIGS. 13 and 14 are respectively a perspective and a partially exploded view illustrating the construction of another child seat 300 that may be installed on the seat mounts 134 of the child stroller apparatus 100. The child seat 300 can be a stroller seat including a seat frame 302 and a tray 304 pivotally connected with each other. The seat frame 302 can have a closed shape for attachment of a softgoods material adapted to provide sitting support. According to an example of construction, the seat frame 302 can include two frame portions 310 and 312, each of which exemplary having a generally U-shape and being comprised of a tubular assembly. The frame portion 310 can be a lower frame portion close to a leg rest region of the child seat 300, and the frame portion 312 can be an upper frame portion close to a backrest region of the child seat 300. The two frame portions 310 and 312 are pivotally connected with each other so that they are rotatable relative to each other for unfolding or collapsing the child seat 300. For example, each of a left and a right end of the frame portion 310 can be respectively connected fixedly with a side coupling part 314, and each of a left and a right end of the other frame portion 312 can be respectively connected fixedly with a coupling shell 316 that is pivotally connected with the side coupling part 314 associated therewith about a pivot axis P1. The frame portion 312 is thereby pivotally connected with the two side coupling parts 314 of the frame portion 310 about the pivot axis P1.

Figure 15:
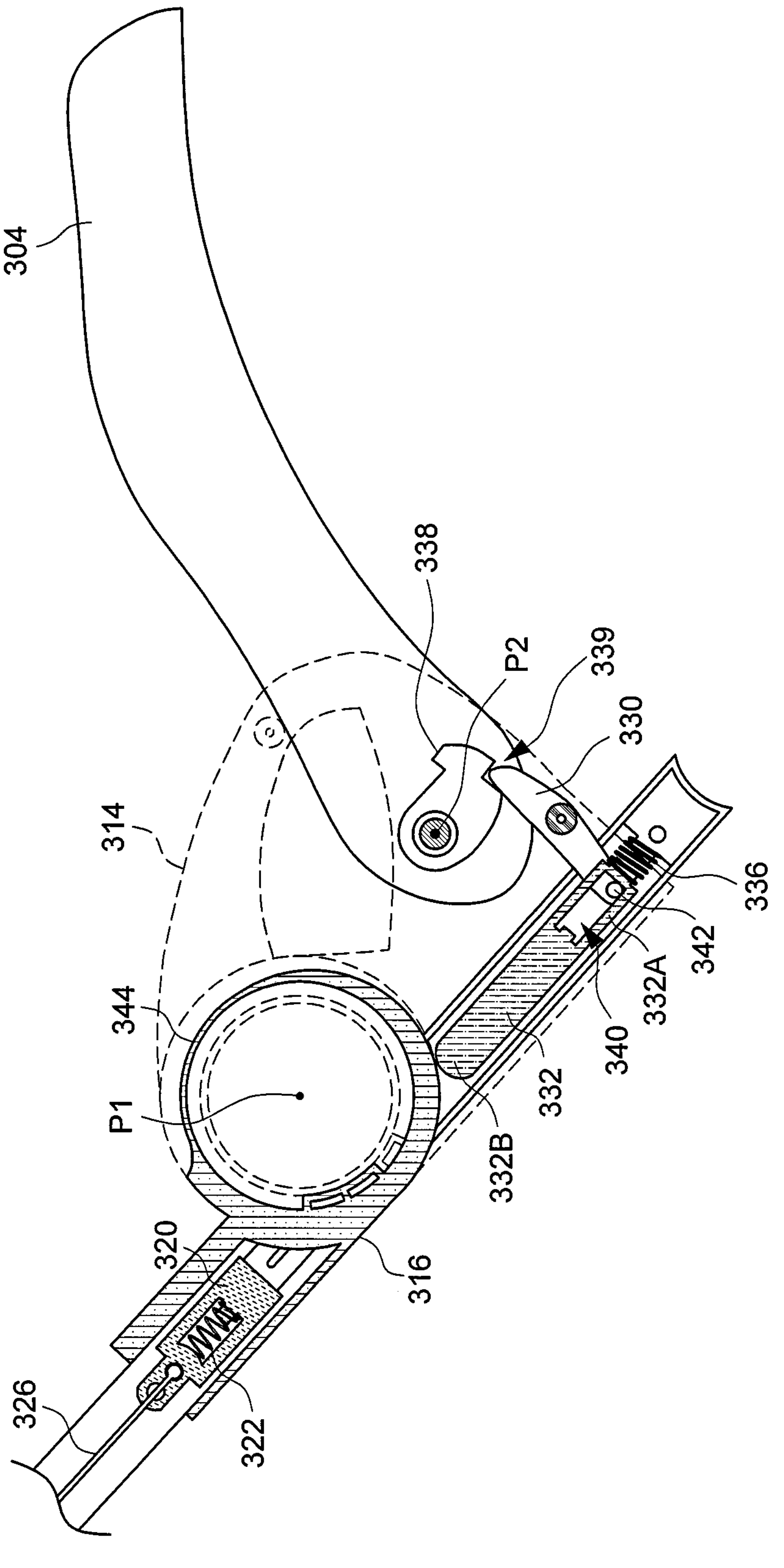
FIG. 15 is a cross-sectional view illustrating some construction details of the child seat shown in FIG. 13 with the tray thereof locked in its deployed position.

In conjunction with FIG. 13, FIGS. 14 and 15 are respectively a partially exploded and a schematic cross-sectional view illustrating further construction details of the child seat 300. Referring to FIGS. 14 and 15, a locking mechanism can be provided at each of the left and right sides of the seat frame 302 for locking the child seat 300 in the unfolded state for use. This locking mechanism can include a latch 320 and a spring 322. The latch 320 can be slidably assembled in a hollow side segment of the frame portion 312, and can travel through the coupling shell 316 for engaging with or disengaging from the side coupling part 314 associated therewith. The spring 322 can have two ends respectively affixed with the latch 320 and the frame portion 312, and can bias the latch 320 toward a locking state for engagement with the side coupling part 314. The latch 320 can be further connected with a release actuator 324 via a cable 326. The release actuator 324 can be assembled on a transversal segment of the frame portion 312, and the cable 326 can have two opposite ends respectively connected with the release actuator 324 and the latch 320 associated therewith. The release actuator 324 is operable to concurrently drive the two latches 320 at the left and right sides for respectively disengaging from the two side coupling parts 314, thereby unlocking the seat frame 302 for rotational movement of the frame portion 312 relative to the frame portion 310.

The tray 304 can be a front tray of the child seat 300. The tray 304 can have a left and a right side respectively connected pivotally with the side coupling parts 314 about another pivot axis P2. For example, the tray 304 may be assembled with the side coupling parts 314 at an inner side thereof. The tray 304 can thereby rotate about the pivot axis P2 relative to the side coupling parts 314 of the seat frame 302 between a deployed position for use (as shown in FIGS.

Figure 16:
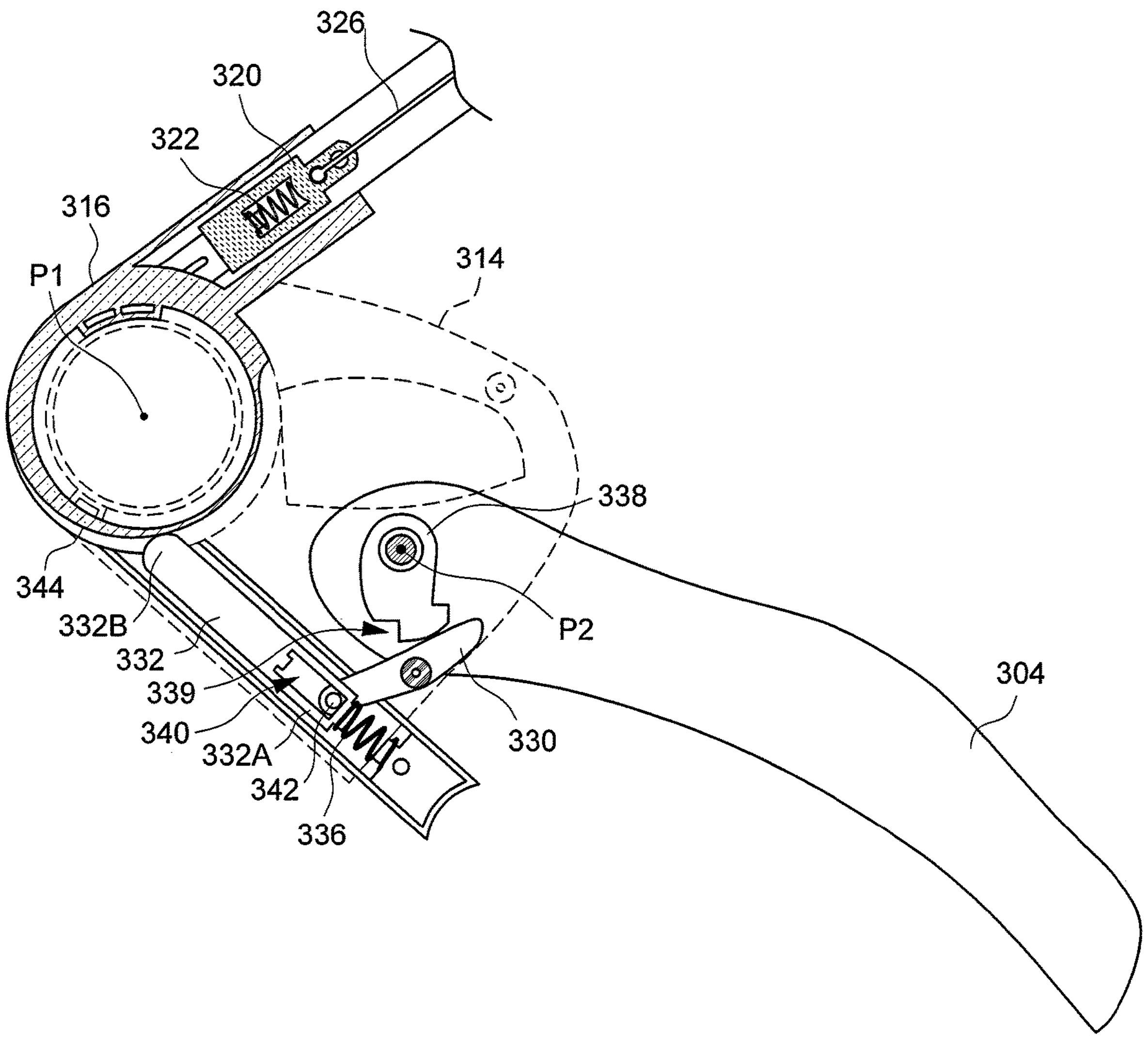
FIG. 16 is a cross-sectional view illustrating some construction details of the child seat shown in FIG. 13 with the tray thereof unlocked and in its collapsed position.

13 and 15) and a collapsed position for facilitating storage of the child seat 300 (as shown in FIG. 16).

Referring to FIGS. 14 and 15, each of the left and right sides of the seat frame 302 can respectively include a tray latch 330, a linking member 332 and two springs 334 and 336, which are all assembled with one corresponding side coupling part 314. The tray latch 330 can be pivotally connected with the side coupling part 314 at a location offset from the pivot axis P2 of the tray 304, the pivot axis of the tray latch 330 being parallel to the pivot axis P2 and extending transversally as the pivot axis P2. The tray latch 330 can rotate relative to the side coupling part 314 for engaging with the tray 304 for locking it in the deployed position for use, or disengaging from the tray 304 for its rotation between the deployed and collapsed position. According to an example of construction, a side of the tray 304 may be fixedly connected with a protrusion 338 having a notch 339 disposed eccentric from the pivot axis P2, and the tray latch 330 can engage or disengage the notch 339 for locking or unlocking the tray 304.

The spring 334 can have two ends respectively connected with the tray latch 330 and the side coupling part 314. The spring 334 can rotationally bias the tray latch 330 for locking engagement with the tray 304.

Figure 17:
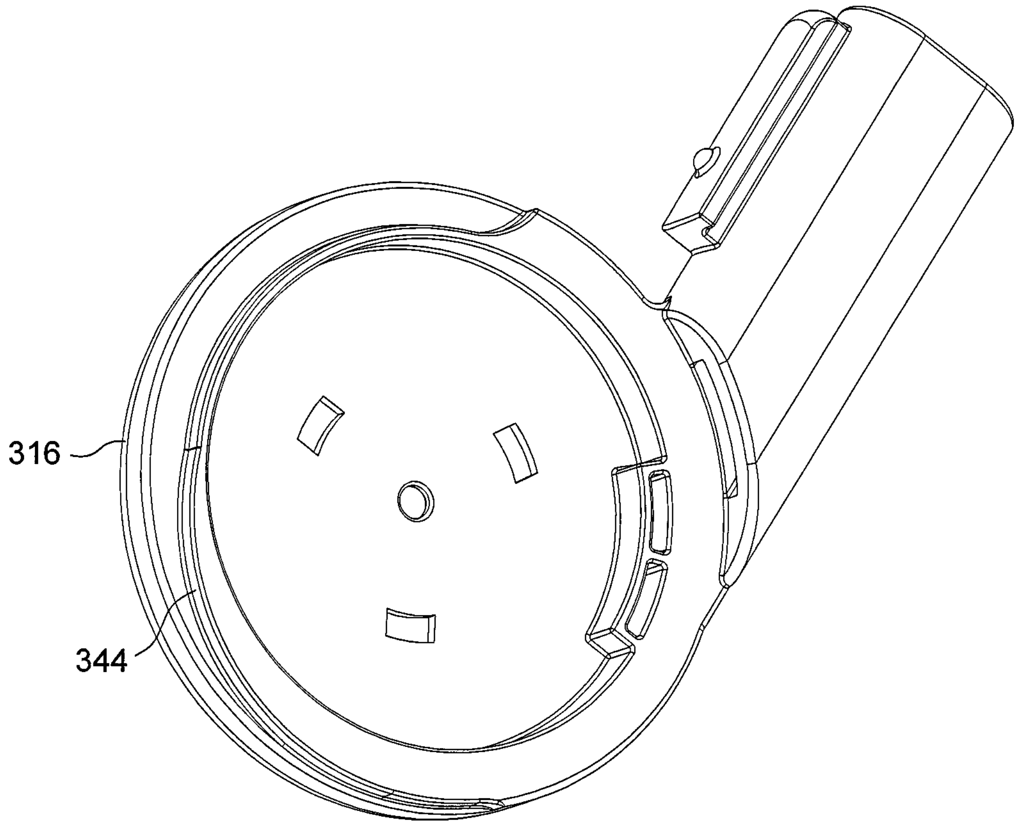
FIG. 17 is a perspective view illustrating a coupling shell with a cam surface at an inner side thereof.

The linking member 332 can be slidably connected with the side coupling part 314, and can have two opposite end portions respectively connected with the tray latch 330 and the coupling shell 316. According to an example of construction, the linking member 332 can be formed integrally as a single part having an elongate shape. A first end portion 332A of the linking member 332 can have a guide slot 340 in which a pin 342 fixedly connected with the tray latch 330 can be slidably and pivotally received. A second end portion 332B of the linking member 332 can be in sliding contact with a cam surface 344 provided on the frame portion 312 of the seat frame 302. For example, the cam surface 344 may be formed as a curved or arcuate surface provided at an inner side of the coupling shell 316 of the frame portion 312, the cam surface 344 being movable in unison with the coupling shell 316 and the frame portion 312. FIG. 17 is a perspective view illustrating the coupling shell 316 with the cam surface 344 at the inner side thereof. Owing to the sliding contact between the linking member 332 and the cam surface 344, the linking member 332 is movable to urge the tray latch 330 to rotate and disengage from the tray 304 during a folding rotation of the frame portion 312 relative to the frame portion 310.

The spring 336 can have two opposite ends respectively connected with the linking member 332 and the side coupling part 314. The spring 336 can bias the linking member 332 in a direction for keeping the linking member 332 in sliding contact with the cam surface 344 and urging an unlocking displacement of the tray latch 330.

When the seat frame 302 is in its unfolded state, the latch 320 biased by the spring 322 can engage with the side coupling part 314 at each of the left and right sides for locking the frame portion 312 in its unfolded position relative to the frame portion 310. Moreover, the tray latch 330 biased by the spring 334 can engage with the notch 339 to lock the tray 304 in its deployed position for use. FIG. 15 shows the tray latch 330 locking the tray 304 in its deployed position.

For collapsing the seat frame 302, a caregiver can operate the release actuator 324 so as to urge the latch 320 at each of the left and right sides to disengage from the side coupling part 314 and thereby unlock the frame portion 312 with respect to the frame portion 310. Then the unlocked frame portion 312 can be rotated in a first direction for folding forward onto the frame portion 310. As a result, the cam surface 344 can move in unison with the frame portion 312, which results in a sliding displacement of the linking member 332 that can urge the tray latch 330 to rotate and disengage from the notch 339 of the tray 304 owing to the contact between the pin 342 of the tray latch 330 and an end of the guide slot 340 in the linking member 332. The tray 304 is thereby unlocked, and can rotate forward (e.g., by gravity action) relative to the side coupling parts 314 for folding onto the frame portion 310. This is schematically shown in FIG. 16.

For unfolding the child seat 300, the frame portion 312 can rotate relative to the frame portion 310 in a second direction opposite to the aforementioned first direction until it reaches its unfolded position and the latch 320 at each of the left and right sides engages with the side coupling part 314 and locks the frame portion 312 with respect to the frame portion 310. During this unfolding rotation, the cam surface 344 moves in unison with the frame portion 312, which results in the linking member 332 to slide for releasing its biasing action on the tray latch 330. The tray 304 then can be rotated relative to the side coupling parts 314 and the frame portion 310 to its deployed position.

Referring again to FIGS. 13 and 14, the child seat 300 can further include two connectors 346 that are respectively assembled with the seat frame 302 at the left and right sides thereof. The connectors 346 can engage and lock with the seat mounts 134 of the child stroller apparatus 100 for fastening the child seat 300 on the child stroller apparatus 100, and disengage and unlock from the seat mounts 134 for removal of the child seat 300 from the child stroller apparatus 100. According to an example of construction, the two connectors 346 may be respectively connected pivotally with the two side coupling parts 314 at the inner sides thereof. Each connector 346 can include a housing 348 having a coupling portion 348A and an insert portion 348B. The coupling portion 348A of the housing 348 can be pivotally connected with the side coupling part 314, e.g., about the same pivot axis P1 of the frame portion 312. The insert portion 348B of the housing 348 can have a hollow interior in which is assembled a locking member 350. When the child seat 300 is installed on the child stroller apparatus 100, the insert portion 348B of the housing 348 can be inserted into a socket of one seat mount 134, and the locking member 350 can engage with the seat mount 134 for fixedly attaching the child seat 300.

Referring to FIG. 14, the locking member 350 may be connected with a driving member 352, which is assembled with the housing 348 for sliding movement generally perpendicular to the sliding axis of the locking member 350. For example, the driving member 352 may include a guide slot 352A, and the locking member 350 may have a pin slidably assembled through the guide slot 352A. The driving member 350 is thereby movable in a first direction to drive an unlocking displacement of the locking member 350, and in a second direction opposite to the first direction to drive a locking displacement of the locking member 350. Moreover, the driving member 352 may be connected with a release button 354, the release button 354 being pivotally assembled with the side coupling part 314. The release button 354 can be operable to urge the driving member 352 to slide in the first direction and thereby cause an unlocking displacement of the locking member 350. A spring 356 may be provided for assisting the locking member 350 to recover a locking position. The spring 356 may be exemplary connected with the release button 354.

For rotationally locking the seat frame 302 in the different configurations of use (e.g., bassinet or seat configuration) relative to the connectors 346, the child seat 300 can further include a lock mechanism respectively disposed adjacent to the connector 346 at each of the left and right sides, which can include a latch 362, a spring 364 and a release button 366. The latch 362 can have a circumference provided with a plurality of teeth, and can be disposed in a cavity delimited at least partially by the side coupling part 314 and the coupling portion 348A of the housing 348. The latch 362 can be assembled for sliding movement along the pivot axis P1 of the seat frame 302 relative to the connectors 346 between a locking and an unlocking position. In the locking position, the latch 362 can engage with teeth respectively provided in the side coupling part 314 and the housing 348 of the connector 346, thereby rotationally locking the seat frame 302 with respect to the connector 346. In the unlocking position, the latch 362 can disengage from the teeth of the side coupling part 314 for rotation of the seat frame 302 relative to the connector 346.

The spring 364 can be respectively connected with the latch 362 and the coupling portion 348A of the housing 348, and can bias the latch 362 for locking engagement with the side coupling part 314. The release button 366 can be assembled with the coupling shell 316 for sliding along the pivot axis P1, and can be connected with the latch 362. The release button 366 can be depressed to push the latch 362 to move to the unlocking position against the biasing action of the spring 364, thereby allowing rotation of the seat frame 302 relative to the connector 346.

Advantages of the child stroller apparatuses described herein include the ability to provide a stroller frame that can receive the installation of a detachable child seat, and can collapse with the child seat installed thereon. When the child stroller apparatus is folded, the child seat can be displaced along leg portions of the stroller frame so as to achieve a more compact size of the child stroller apparatus in the collapsed state. Moreover, examples of the child seat described herein can be conveniently convertible between multiple configurations of use, offering versatility for the caregiver.

Realizations of the child stroller apparatuses have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child seat comprising:

a seat frame including a first frame portion having a side coupling part, and a second frame portion pivotally connected with the side coupling part, the first frame portion and the second frame portion being rotatable relative to each other for unfolding and collapsing the child seat;

a tray pivotally connected with the side coupling part, the tray being rotatable relative to the side coupling part;

a tray latch pivotally connected with the side coupling part, the tray latch being operable to engage with the tray for locking the tray to the side coupling part and disengage from the tray for rotation of the tray relative to the side coupling part; and a linking member operatively connected with the tray latch and the second frame portion, wherein a rotation of the second frame portion for collapsing the child seat causes a movement of the linking member that urges the tray latch to rotate relative to the side coupling part and disengage from the tray.

2. The child seat according to claim 1, wherein the second frame portion has a cam surface, and the linking member is in sliding contact with the cam surface.

3. The child seat according to claim 2, further comprising a spring connected with the linking member and the side coupling part, the spring biasing the linking member toward the cam surface.

4. The child seat according to claim 3, wherein the spring is configured to bias the linking member to move in a direction that urges the tray latch to disengage from the tray.

5. The child seat according to claim 2, wherein the second frame portion is fixedly connected with a coupling shell that is pivotally connected with the side coupling part, and the cam surface is provided at an inner side of the coupling shell.

6. The child seat according to claim 1, wherein the tray latch is fixedly connected with a pin, and the linking member has a guide slot in which the pin is received.

7. The child seat according to claim 1, wherein a side of the tray is fixedly connected with a protrusion having a notch, and the tray latch engages or disengages the notch for locking or unlocking the tray.

8. The child seat according to claim 1, further comprising a spring connected with the tray latch and the side coupling part, the spring rotationally biasing the tray latch for locking engagement with the tray.

9. The child seat according to claim 1, wherein the second frame portion and the tray are respectively rotatable about two spaced-apart pivot axes relative to the side coupling part.

10. The child seat according to claim 1, further comprising a connector pivotally connected with the side coupling part, the connector being engageable with a seat mount provided on a child stroller apparatus for fastening the child seat on the child stroller apparatus, and disengaged from the seat mount for removal of the child seat from the child stroller apparatus, the seat frame being rotatable relative to the connector for converting the child seat between multiple configurations of use.

11. The child seat according to claim 10, wherein the connector and the second frame portion are pivotally connected with the side coupling part about a same pivot axis.

12. The child seat according to claim 10, wherein the side coupling part has an inner side and an outer side opposite to each other, and the connector includes a housing that is pivotally connected with the side coupling part at the inner side thereof.

13. The child seat according to claim 12, wherein the second frame portion is pivotally connected with the side coupling part at the outer side thereof.

14. The child seat according to claim 10, further comprising a latch operable to rotationally lock the seat frame with respect to the connector, and a release button operable to urge an unlocking displacement of the latch.

15. The child seat according to claim 1, further comprising a locking mechanism operable to lock the child seat in an unfolded state.

16. The child seat according to claim 15, wherein the locking mechanism comprises a latch assembled with the second frame portion, the latch being movable between a first position where the latch is engaged with the side coupling part for locking the child seat in the unfolded state, and a second position where the latch is disengaged from the side coupling part for rotation of the second frame portion relative to the first frame portion.

17. The child seat according to claim 16, wherein the second frame portion is fixedly connected with a coupling shell that is pivotally connected with the side coupling part, and the latch is configured to travel into the coupling shell for engaging with or disengaging from the side coupling part.

18. The child seat according to claim 17, wherein a cam surface is provided at an inner side of the coupling shell, and the linking member is in sliding contact with the cam surface.

19. A child stroller apparatus comprising:

a handle frame connected with a first leg portion and a second leg portion; and the child seat according to claim 1, being supported on the first and second leg portions.

20. The child stroller apparatus according to claim 19, wherein the first leg portion is provided with a seat mount, and the child seat is detachably fastened to the seat mount.

* * * * *